United States Patent
Ogawa et al.

(10) Patent No.: US 6,754,736 B1
(45) Date of Patent: Jun. 22, 2004

(54) INFORMATION PROCESSING APPARATUS, DATA INPUTTING/OUTPUTTING METHOD, AND PROGRAM STORAGE MEDIUM THEREFOR

(75) Inventors: Naoshi Ogawa, Kanagawa (JP); Takahiro Kurosawa, Kanagawa (JP); Mitsuhiro Kishimoto, Kanagawa (JP); Keisuke Fukui, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 458 days.

(21) Appl. No.: 09/593,425

(22) Filed: Jun. 14, 2000

(30) Foreign Application Priority Data

Jun. 23, 1999 (JP) ............................................. 11-176279
Jun. 29, 1999 (JP) ............................................. 11-183118
Jun. 30, 1999 (JP) ............................................. 11-184583

(51) Int. Cl.[7] ................................................. G06F 3/00

(52) U.S. Cl. ................................. 710/39; 710/5; 710/8; 710/52; 711/100

(58) Field of Search .............................. 710/1, 5, 13, 17, 710/18, 31, 33, 36, 39, 52, 112, 8, 56, 73; 712/225; 711/100; 709/201

(56) References Cited

U.S. PATENT DOCUMENTS

| | | | | |
|---|---|---|---|---|
| 5,123,098 A | * | 6/1992 | Gunning et al. | 711/2 |
| 5,220,653 A | * | 6/1993 | Miro | 395/275 |
| 5,598,549 A | * | 1/1997 | Rathunde | 711/114 |
| 5,754,882 A | * | 5/1998 | Tobagi et al. | 710/6 |
| 5,875,343 A | * | 2/1999 | Binford et al. | 710/263 |
| 5,915,131 A | * | 6/1999 | Knight et al. | 710/72 |
| 6,292,856 B1 | * | 9/2001 | Marcotte | 710/39 |

* cited by examiner

Primary Examiner—Jeffrey Gaffin
Assistant Examiner—RiJue Mai
(74) Attorney, Agent, or Firm—Staas & Halsey LLP

(57) ABSTRACT

When a user process issues an input/output request in a process performed in response to the input/output request generated by the user process, the input/output request is queued in the input/output request list which is a queue in a list format on the user space side. On the kernel side, when a input/output request in the input/output request list is processed, the status is changed into 'processed', and a list element whose status indicates 'processed' is removed from the request list on the user space side. On the kernel side, a thread for performing a process in response to an input/output request is divided into a plurality of threads, and the CPU is released to another thread before completion of the process.

12 Claims, 21 Drawing Sheets

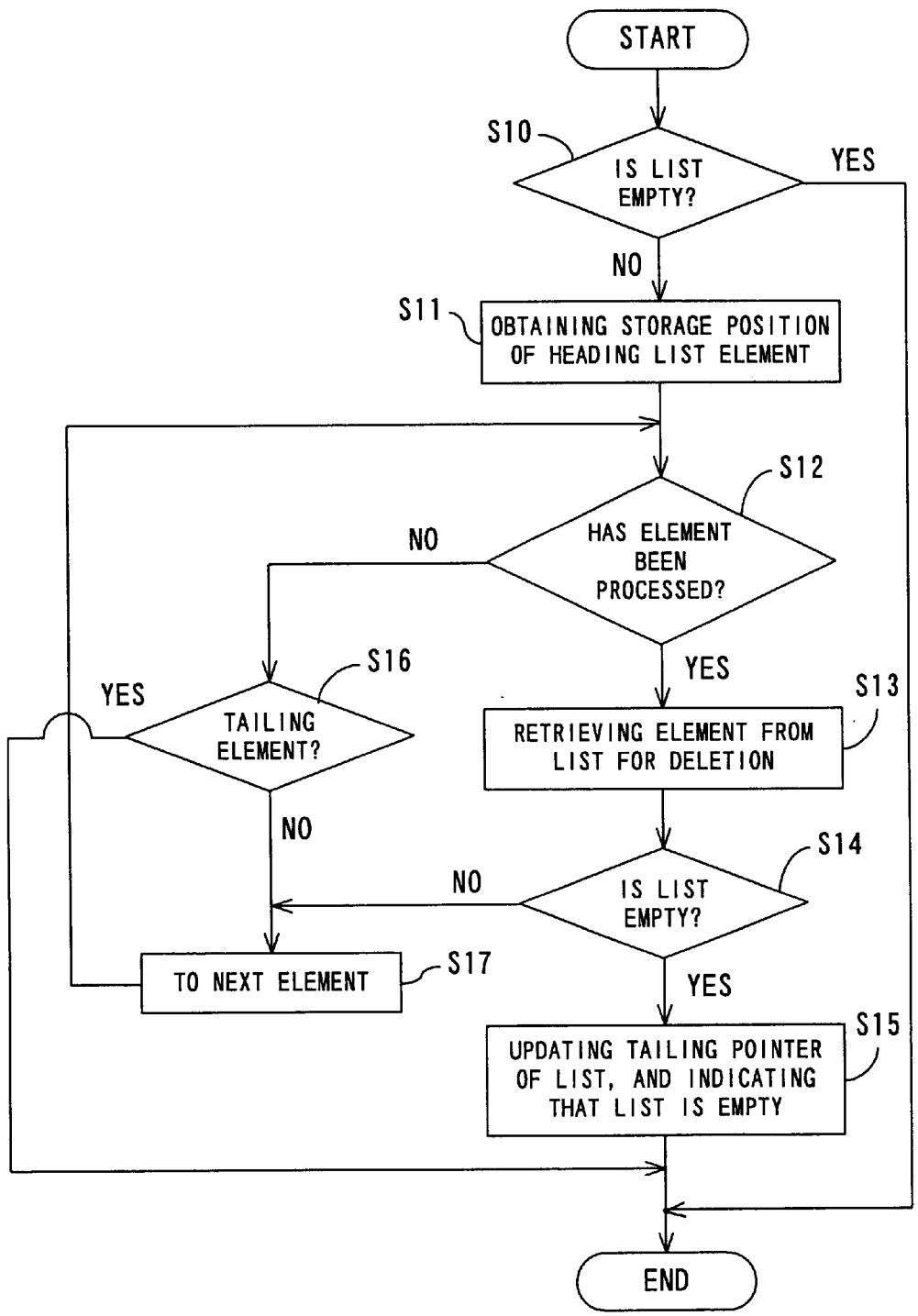
F I G. 6

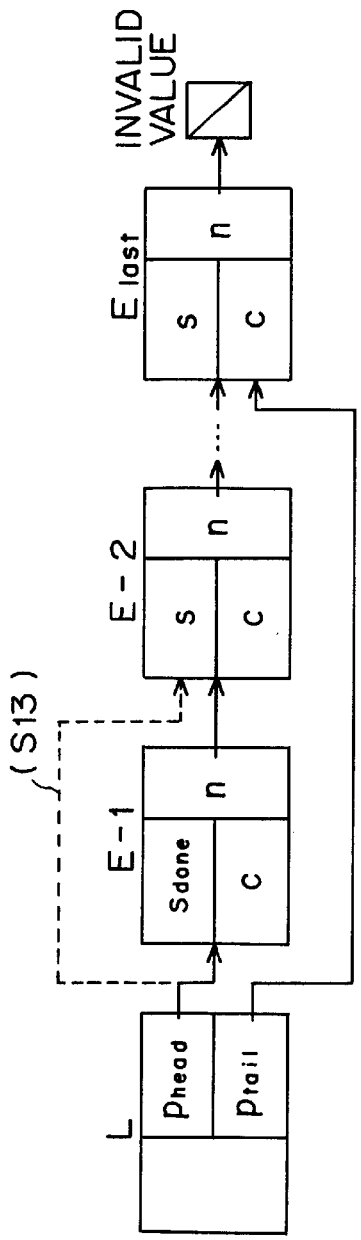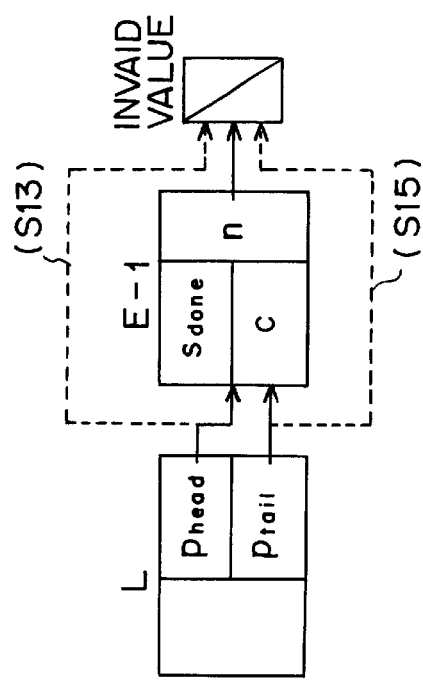
FIG. 7A
FIG. 7B

```
/*
 *Wait condition variable
 */
kmutex_enter(&muex);
while(state & OUTSTANDING)
    cv_wait(&condvar, &mutex);
kmutex_enter(&mutex);
```

FIG. 11A

```
/*
 *condition variable broadcast
 */
kmutex_enter(&mutex);
state &=~OUTSTANDING;
cv_broadcast(&condvar);
kmutex_exit(&mutex);
```

FIG. 11B

```
/*
 *Wait condition variable
 */
kmutex_enter(&mutex);
while(state & OUTSTANDING)
    cv_wait(&condvar, &mutex);
kmutex_exit(&mutex);
```

FIG. 11C

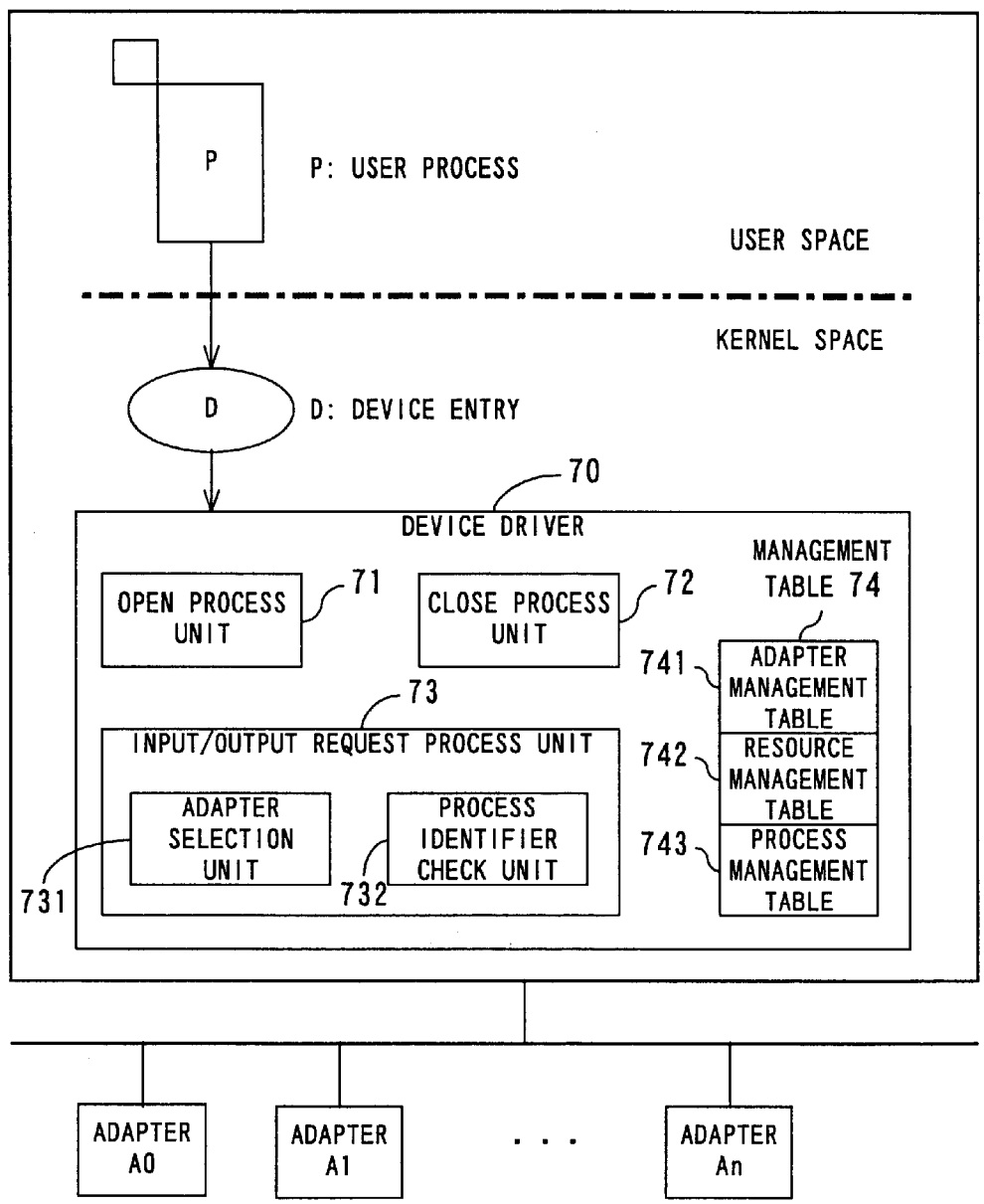
F I G. 1 2

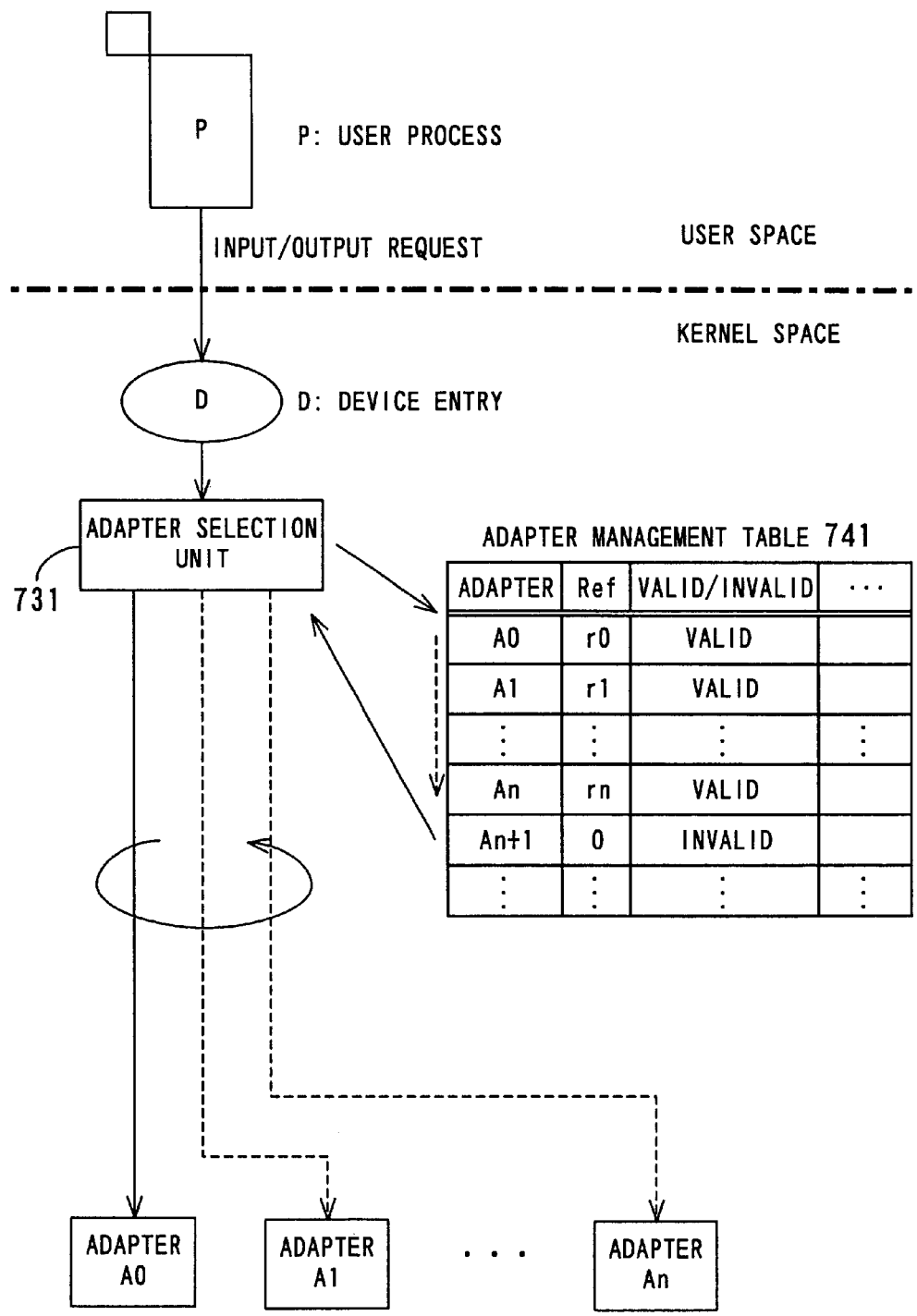
F I G. 1 3

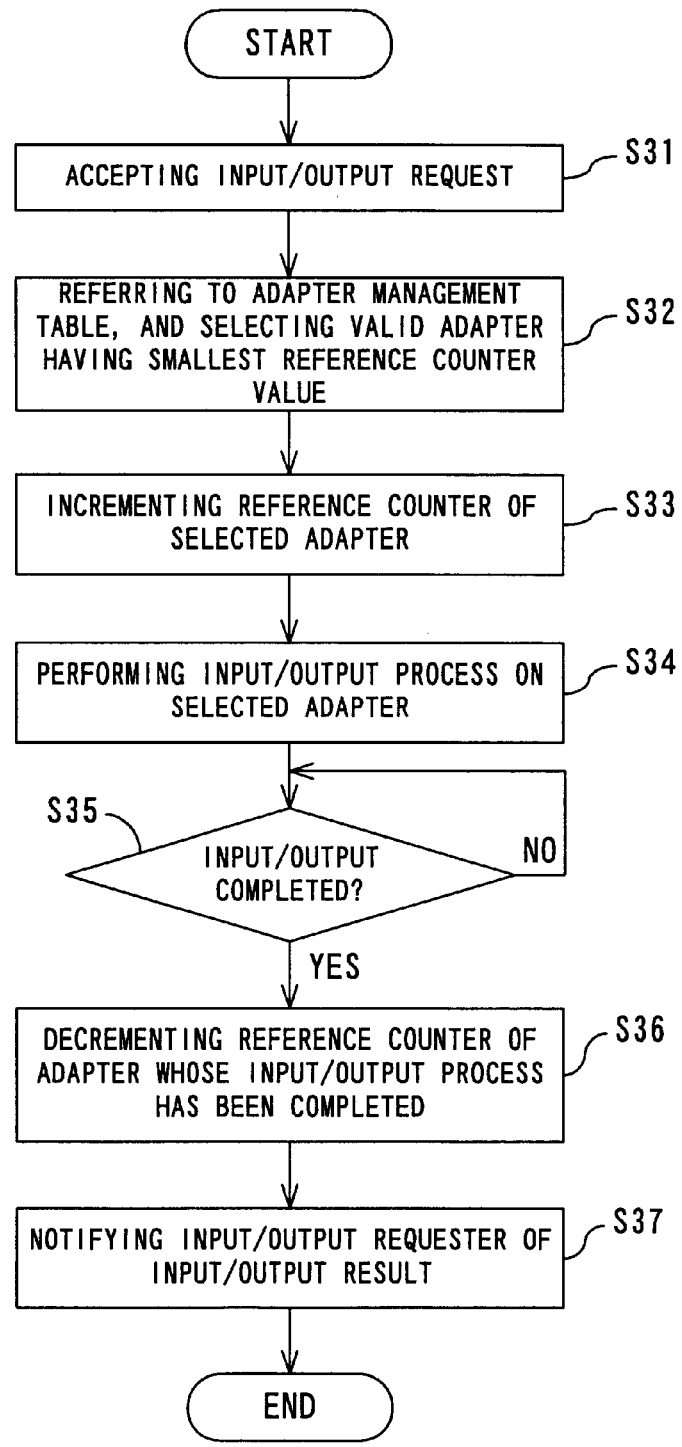
F I G. 1 4

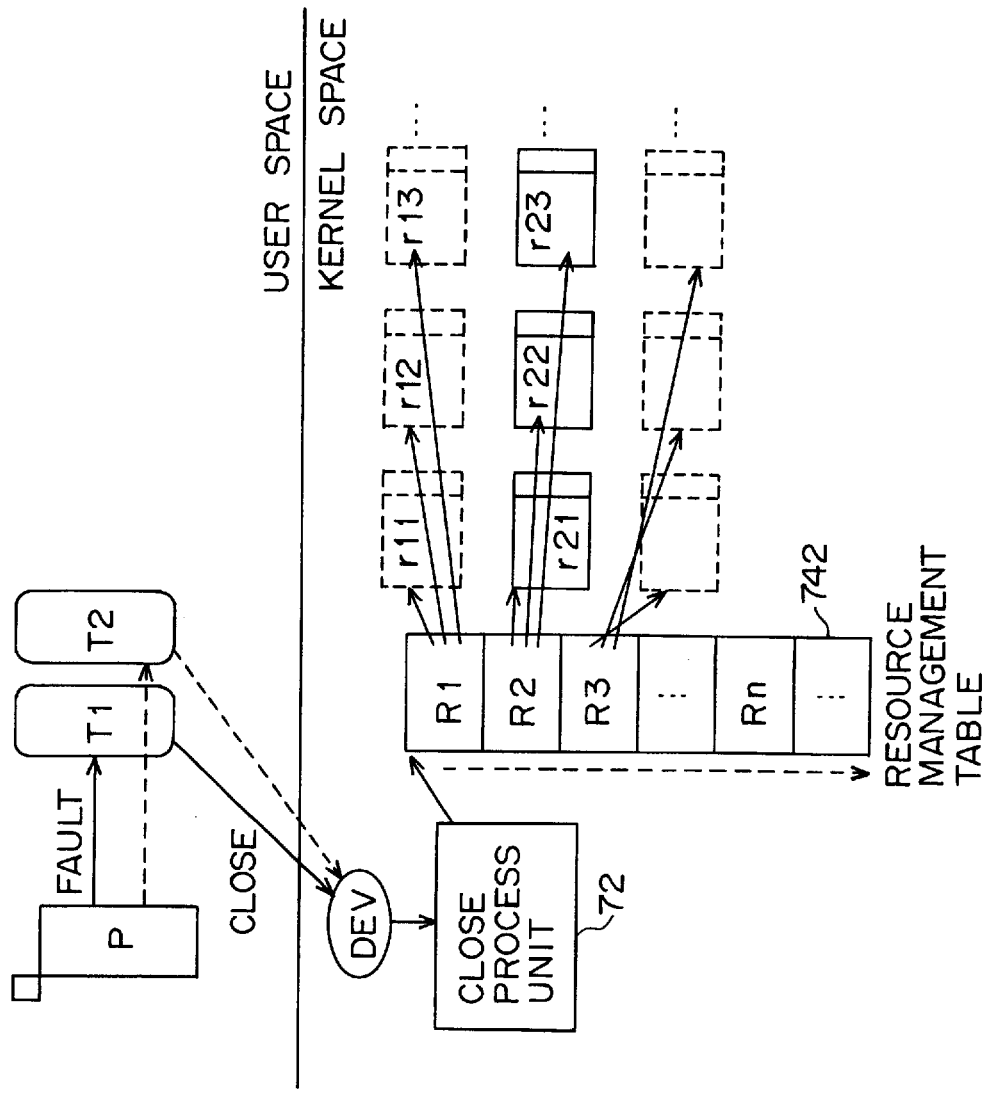
F I G. 16

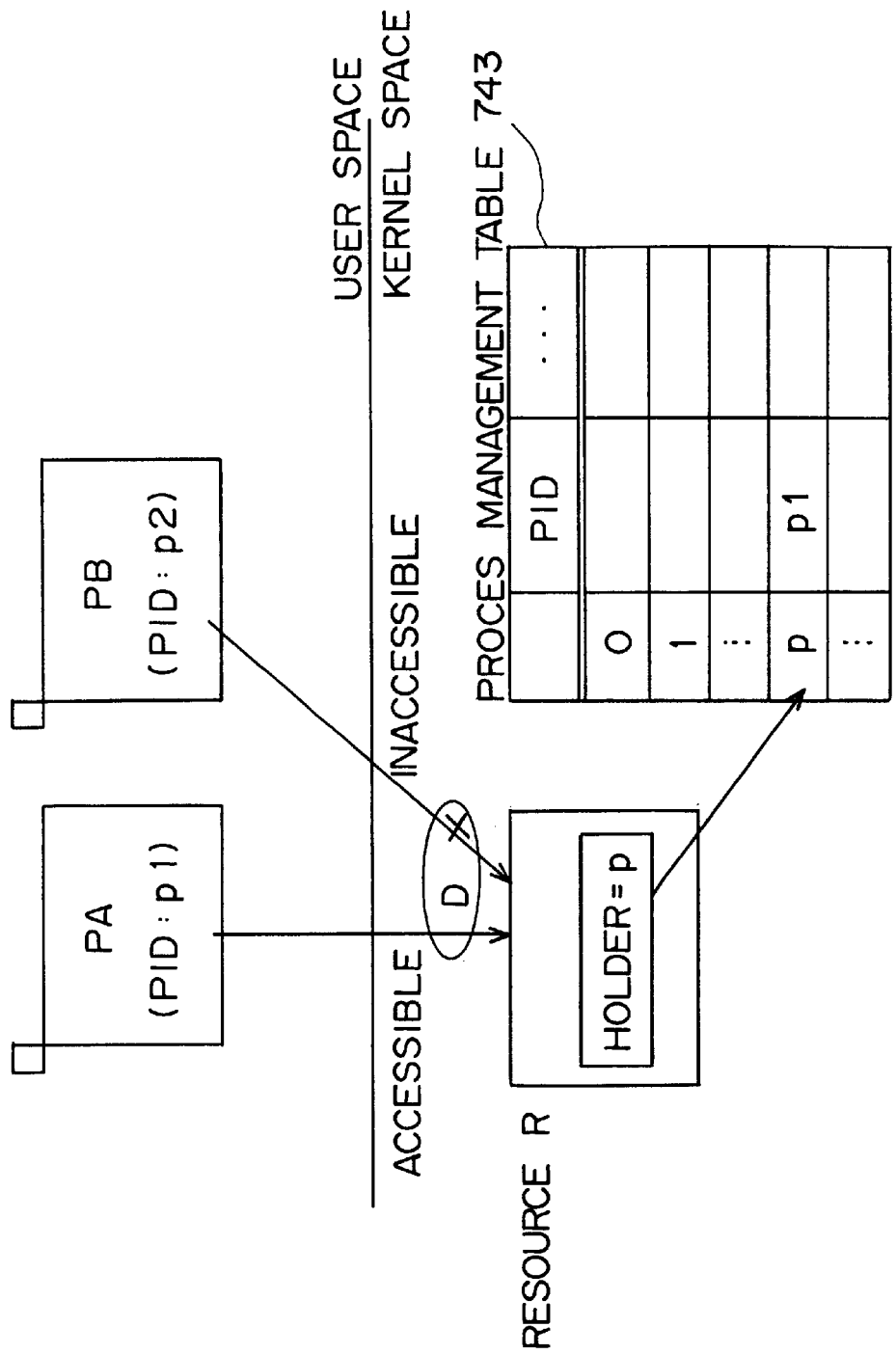
F I G. 18

```
/*
*process structure
*/
typedef struct_process{
    enum{
PROC_CLOSE=0,
PROC_OPEN
    }p_status;                  /*FLAG INDICATING WHETHER PROCESS IS OPEN OR CLOSE?*/
    int         p_refcnt;       /*COUNT BEING REFERENCED*/
    kmutex_t    p_mu;           /*VARIABLE WHEN CURRENT STRUCTURE IS TO BE EXCLUSIVELY CONTROLLED*/
    event_t     p_close_ev;     /*EVENT RECEPTION OF DEVICE CLOSE*/
    int         p_minor;        /*MINOR DEVICE NUMBER*/
    pid_t       p_my_pid;       /*PROCESS INDETIFIER*/
    mailbox_t   p_err_mbx;      /*MAIL BOX ANNOUNCING ERROR*/
    event_t     p_aio_ev;       /*EVENT RECEPTION FROM ASYNCHRONOUS IO MONITOR*/
    struct{
        kmutex_t     sync_mu;
        kcondvar_t   aio_cv;
        kcondvar_t   knic_cv;
        volatile int aio_flag;
        volatile int knic_flag;
    }p_sync                     /*STRUCTURE FOR SYNCHRONOUS PROCESS FOR CLOSING DEVICE*/
}_process_t;
```

F I G. 1 9

INFORMATION PROCESSING APPARATUS, DATA INPUTTING/OUTPUTTING METHOD, AND PROGRAM STORAGE MEDIUM THEREFOR

BACKGROUND OF THE INVENTION

1. Field of the Invention

The present invention relates to inputting and outputting data between nodes or between a node and a peripheral device in a computer system in which a plurality of nodes are interconnected through a network or in a computer system in which nodes are connected to peripheral devices.

2. Description of the Related Art

Recently, there has arisen a strong demand to develop high-speed and high-reliability data input/output processes performed in a computer system through a network in communicating with CPUs and peripherals. Therefore, it has become more and more important to realize a high-performance and high-reliability data input/output system.

In the conventional data input/output system for synchronously performing a data input/output process in a computer system, a CPU is occupied by a series of operations. In place of the conventional system, there have been an increasing number of asynchronous data input/output systems capable of asynchronously issuing requests to input and output data.

In the asynchronous data input/output processes in the asynchronous system, a thread of a device driver for performing an input/output process for each device is activated in a kernel space by a thread in a user process issuing a predetermined input/output function. Then, the thread in the kernel space actually performs the input/output process requested by the thread of the user process. A thread refers to a process unit which obtains a CPU time.

When a process of inputting and outputting data is performed in an asynchronous system in a computer system, a data area to and from which data is input and output has to be reserved and fixed not to reassigned to another process by virtual storage control, etc. The process of fixing the data area should be performed after a serializing process. Therefore, a thread for the process occupies a long CPU time.

In addition, when data is input and output with the data communicated in a computer system, a thread in a user process is temporarily transferred to a kernel space for synchronization in the kernel space by issuing a system call when it is necessary to be synchronous with another thread in the kernel space.

When it is necessary for a thread in a user space to be synchronous with a thread in a kernel space, the thread in the user space issues a system call for transition to the kernel space and for synchronization with the thread in the kernel space. However, a system call requires a larger overhead than other thread process. Therefore, the transition to the kernel space using the system call is necessary, but causes a delay of the process.

Furthermore, to establish data communications in a computer system, it is common to enter a network adaptor as one device in a system, and explicitly declare the device to perform various processes on a user side.

Conventionally, driver software of each adapter such as a network adapter, etc. exists as each device file. Therefore, when a user process uses an adapter, it is to explicitly designate an adapter to be used. Accordingly, any of a plurality of existing adapters becomes faulty, the user process directly detects the fault. Therefore, to satisfy the requirements for high-reliability, it has been necessary to take action against the fault on the user process side.

In addition, in a computer system which assigns a right number to each device to identify the device using the assigned number, when there are a plurality of identical devices in the system, a device identification number is normally assigned to each device.

At this time, when there are a plurality of processes which have called devices having the same device numbers in the computer system, and if each of these processes issues an end message, only the last issue of the end message is provided for a device driver. Therefore, in a device driver requiring resource management for each process, resources cannot be collected for each process.

Furthermore, a cleanup (collecting) process is performed by each resource as a process to be performed when an abnormal process occurs when data communications are established in a computer system. In the cleanup process performed by each resource, there has been the problem that the process cannot be correctly performed especially when the communications memory management relating to an asynchronous data input/output process system is included in the system as a resource, or when resources are related to each other.

Although a process generates a child process, the resource in a driver is still shared among processes. If one process notifies the driver of, for example, the end of using an adapter, there arises the problem that a related resource in the driver can be released although there are processes still using the adapter.

SUMMARY OF THE INVENTION

To solve the above described problems, the present invention aims at providing a high-efficiency, performance, and reliability data processing apparatus and method capable of inputting and outputting data, and a storage medium storing a program directing an information processing apparatus.

The present invention also aims at setting synchronization without exclusive control between a user space and a kernel space in a data input/output process, and efficiently inputting and outputting data with a small overhead for a system call.

Furthermore, the present invention aims at efficiently inputting and outputting data with a thread for performing a process of fixing a data area prevented from occupying the CPU for a long time.

Additionally, the present invention aims at performing an input/output process, especially in a system in which there are a plurality of identical adapters, without having a user process be aware that there are the plurality of adapters, and also aims at collecting resources held by a process without problems even when the process is in an abnormal state.

The data processing apparatus according to the present invention is based on the function of asynchronously processing in a kernel space an input/output request from a process in a user space. The apparatus includes an input/output request holding unit, and a request list adding unit.

The input/output request holding unit holds an input/output request from a user space to a kernel space as a queue of a list structure.

When a new input/output request is issued in a process in a user space, the request list adding unit adds the input/output request as a list element to the queue.

Upon receipt of an input/output request from a user in a kernel space, an input/output request acceptance unit accepts the input/output request from the user process. An input/output request processing thread generation unit generates a thread for processing the input/output request accepted by the input/output request acceptance unit as a plurality of divided threads.

For example, the unit generates the first thread for processing the input/output request, and separately the second thread whose completion time cannot be predicted from the first thread.

When the data processing apparatus has a plurality of identical adapters, input/output requests issued to the plurality of adapters are accepted in one entry, and one of the plurality of adapters is assigned to the input/output requests.

The present invention can realize a high-performance and high reliability data input/output process.

When the above described processes are realized using a program in an information processing apparatus, the program can be stored in an appropriate storage medium which can be read by the information processing apparatus such as portable medium memory, semiconductor memory, a hard disk, etc.

BRIEF DESCRIPTION OF THE DRAWINGS

FIG. 6 is a flowchart of the process performed by a request list deleting unit in case of deleting a processed list element from a request list;

FIG. 7 shows the deleting process shown in FIG. 6;

FIG. 11 shows an example of a method of using a conditional variable;

FIG. 12 shows the process in a device driver performed when an adapter is assigned in response to an input/output request;

FIG. 13 shows the process of assigning an adapter performed by a device driver in response to an input/output request;

FIG. 14 is a flowchart of the processes of selecting an adapter, and other operations;

FIG. 16 shows the cleanup process;

FIG. 18 shows exclusive access to resources;

FIG. 19 shows an example of a process structure;

DESCRIPTION OF THE PREFERRED EMBODIMENT

Figure 1:
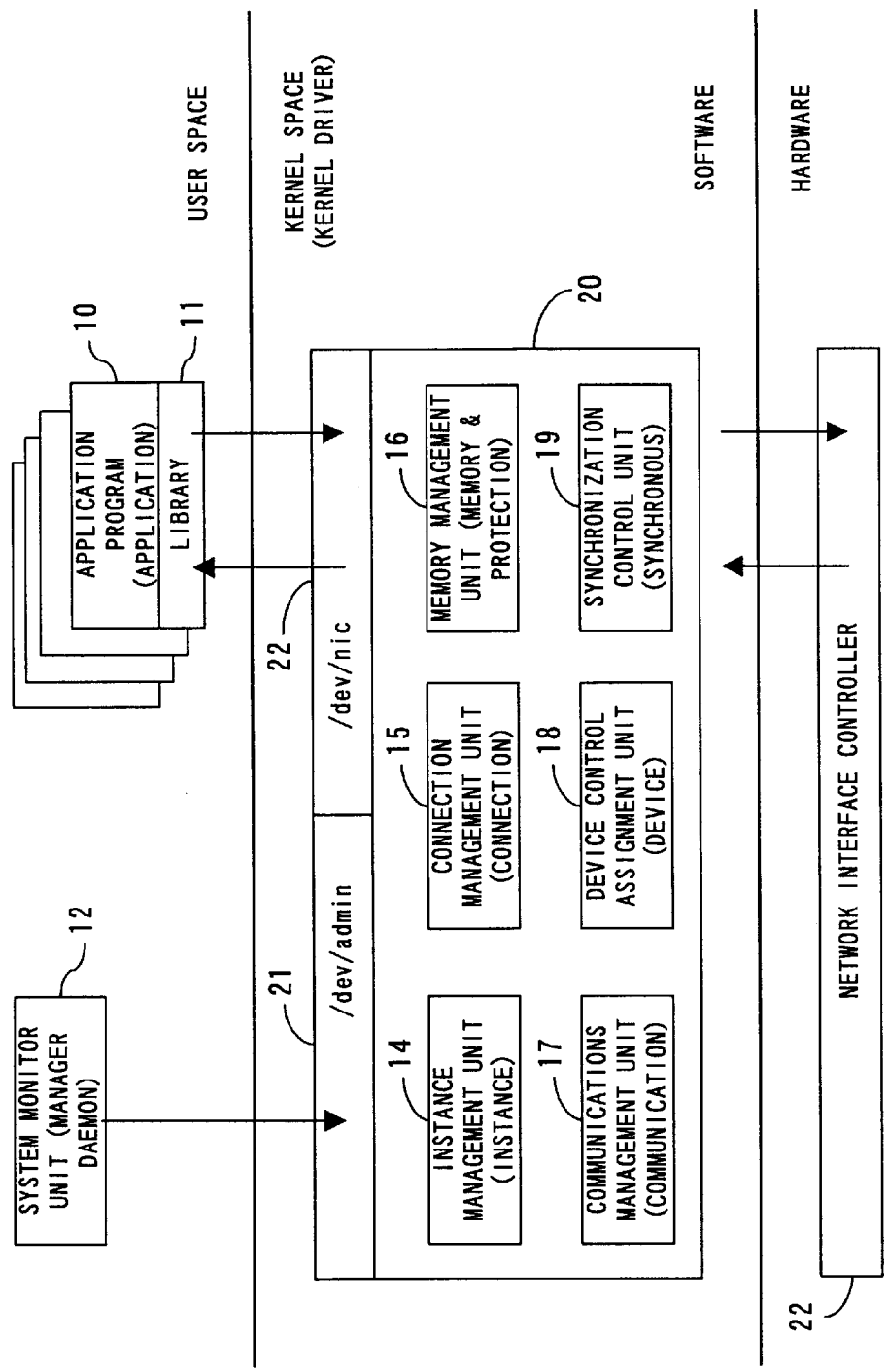
FIG. 1 shows the entire configuration of the system according to an embodiment of the present invention.

FIG. 1 shows the configuration of the entire system according to an embodiment of the present invention.

The present embodiment can be realized in a system as shown in FIG. 1. The system shown in FIG. 1 is a system using a UNIX type operating system (UNIX is a trademark of the X/OPEN Foundation) developed by the Bell Institute of AT & T, and comprises software operating in a user space and a kernel space, and hardware of an information processing system including peripheral devices. In this example, only the portion relating to the present embodiment specifically for data communications is shown. FIG. 1 is prepared based on the OS of UNIX type. However, the present invention is not limited to UNIX, but is applicable to any OS having the function of performing an asynchronous process.

An application program (Application) 10 executes a user job. A library 11 is a communications library whose interface is linked to the application program 10. A system monitor unit (Manager demon) 12 is a demon for monitoring the initialization and the state of the present system, and also controls the closing of a process.

A driver for performing an input/output process in a kernel space comprises the following units. An instance management unit (Instance) 14 manages instances used in the present system as end points in the inter-node data communications. It also holds an instance for management of them. An instance according to the present embodiment refers to a process management structure. A connection management unit (Connection) 15 manages the connection among the instances of the system. A memory management unit (Memory & Protect) 16 protects and manages the memory used in the system. A communications management unit (Communication) 17 manages the communications between the instances, and directly controls a network interface controller 22. A device control assignment unit (Device) 18 receives a request from the system monitor unit 12 or a library 21, and assigns it to a corresponding processing unit in the system. A synchronization control unit (Synchronous) 19 controls the synchronization in the driver.

An interface unit (/dev/nic) 20 provides the interface for the library 11, and the interface unit (/dev/admin) 20 provides the interface for the system monitor unit 12. The network interface controller 22 is a hardware for communications through a network. The network interface controller 22 corresponds to one of the adapters A0 through An shown in FIG. 12, and the apparatus according to the present invention comprises a plurality of the adapters.

The function of each unit is invoked by an input/output function prepared for a system. However, since it is a well-known technology in UNIX operating systems, etc., the detailed explanation is omitted here.

Figure 2:
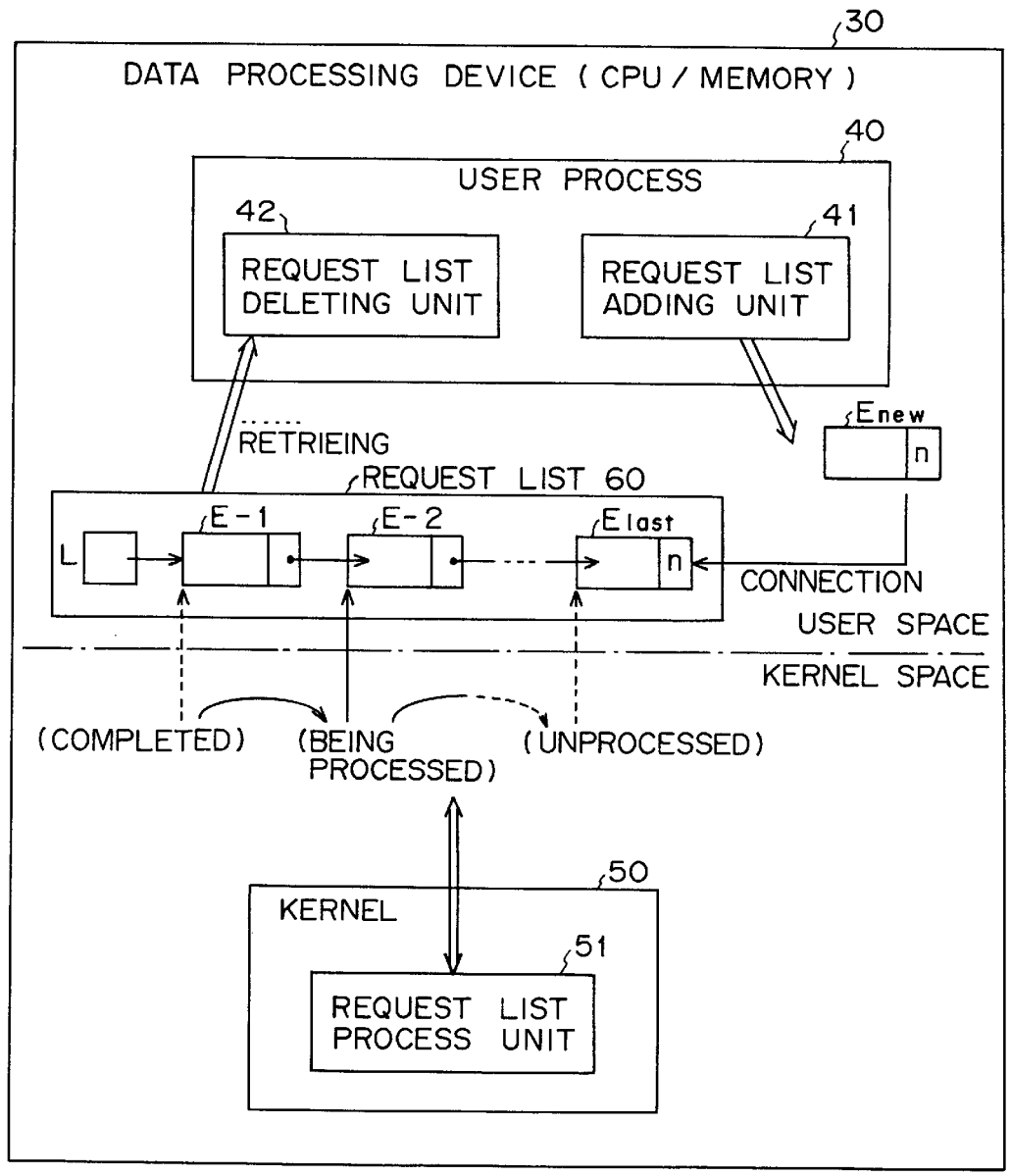
FIG. 2 shows a process of accepting an input/output request from a user process of a system according to an embodiment of the present invention.

FIG. 2 shows the process of accepting an input/output request from a user process of a system according to the present embodiment.

In FIG. 2, a data processing device 30 comprises a CPU, memory, etc. A user process 40 is performed using an application, etc. operated in a user space. A kernel 50 is the core of an operating system operated in a kernel space. A request list 60 is used for management of input/output requests from the user process 40 to the kernel 50.

The request list 60 is generated in the library 11, exists in a user space, and holds information about an input/output request from a user space to a kernel space through a queue pointed to by a list management unit L. A list element E is an element in the request list 60, and contains information about an input/output request from the user process 40, and state information s indicating whether the request has not been processed, it is being processed, or it has been processed.

When an input/output request is issued by the user process 40, a request list adding unit 41 of the user process 40 generates a new list element E storing the information about the request to transmit the request to the kernel 50, sets the state information s about the list element E as 'unprocessed', and adds it to the end of the request list 60.

A request list process unit 51 of a kernel space traces the request list 60, and processes a request in the list element E if the state information s of the list element E indicates 'unprocessed'. A request list deleting unit 42 removes from the list sequentially from the start of the list the element whose process has been completed in the kernel space.

In the conventional system, it is necessary to establish synchronization between a user space and a kernel space using a system call in response to a input/output request from the user process 40. According to the present embodiment, the synchronous can be established between the user space and the kernel space by providing the request list 60 without exclusive control.

According to the present embodiment, a request list process unit 51 of the kernel 50 checks whether or not it has already held the tailing list element in the kernel space when it processes a request for a new list element E. The request list process unit 51 traces the request list 60, refers to the pointer value n indicating the position of the next element in the element E whose process has been completed in the request list 60. If the pointer value n stores a predetermined invalid value is stored, the request list process unit 61 determines that the end of the request list 60 has been reached, and stops the process. If the pointer value n is valid, the request list process unit 61 continues the process, and performs the process on an unprocessed list element whose position is pointed to by the pointer value n. In this operation, it is not necessary to use a system call for establishing synchronization between the user space and the kernel space.

The above described process is described further in detail below.

Figure 3:
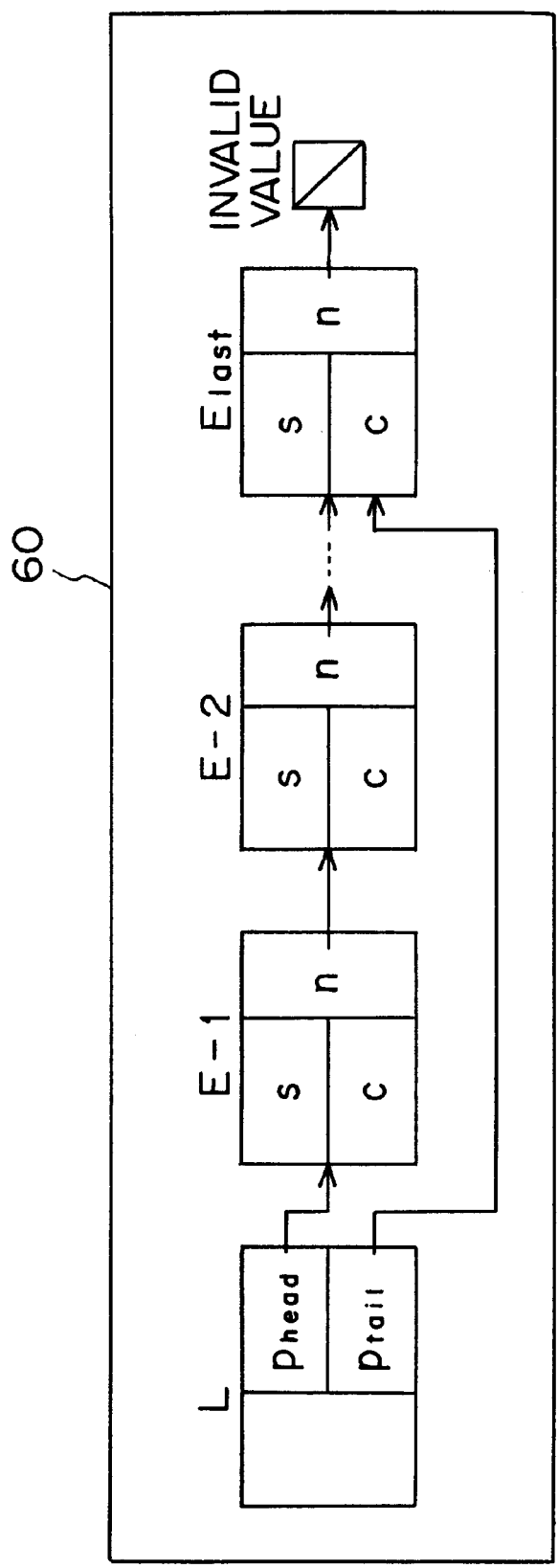
FIG. 3 shows the data structure of a request list.

FIG. 3 shows the data structure of the request list 60. The list management unit L contains a pointer $P_{head}$ to the heading list element E-1, and a pointer $P_{tail}$ to a tailing list element $E_{last}$. Each list element E contains state information s indicating the process state of a kernel, process information c describing the contents to be processed by the kernel, and a pointer value n indicating the location of the next list element. The state information s indicating the process state of the kernel has any of the three values 'unprocessed ($s_{notdown}$)', 'being processed ($s_{busy}$)', and 'processed ($s_{down}$)'.

When the user process 40 issues an input/output request to the kernel 50, a new list element $E_{new}$ is added from a user space to the request list 60. Each list element E of the request list 60 can be referred to without exclusive control from the kernel 50.

On the user space side, the request list deleting unit 42 refers to the state information s indicating the process state in each list element E from the head of the request list 60, and sequentially removes the list E elements which have been processed in the kernel 50. After the user process 40 has added the new list element $E_{new}$, the contents other than those of the next element pointer n in the list element E cannot be changed until the kernel 50 completes the process of the list element and changes the state to s indicates 'processed ($s_{down}$)'.

Figure 4:
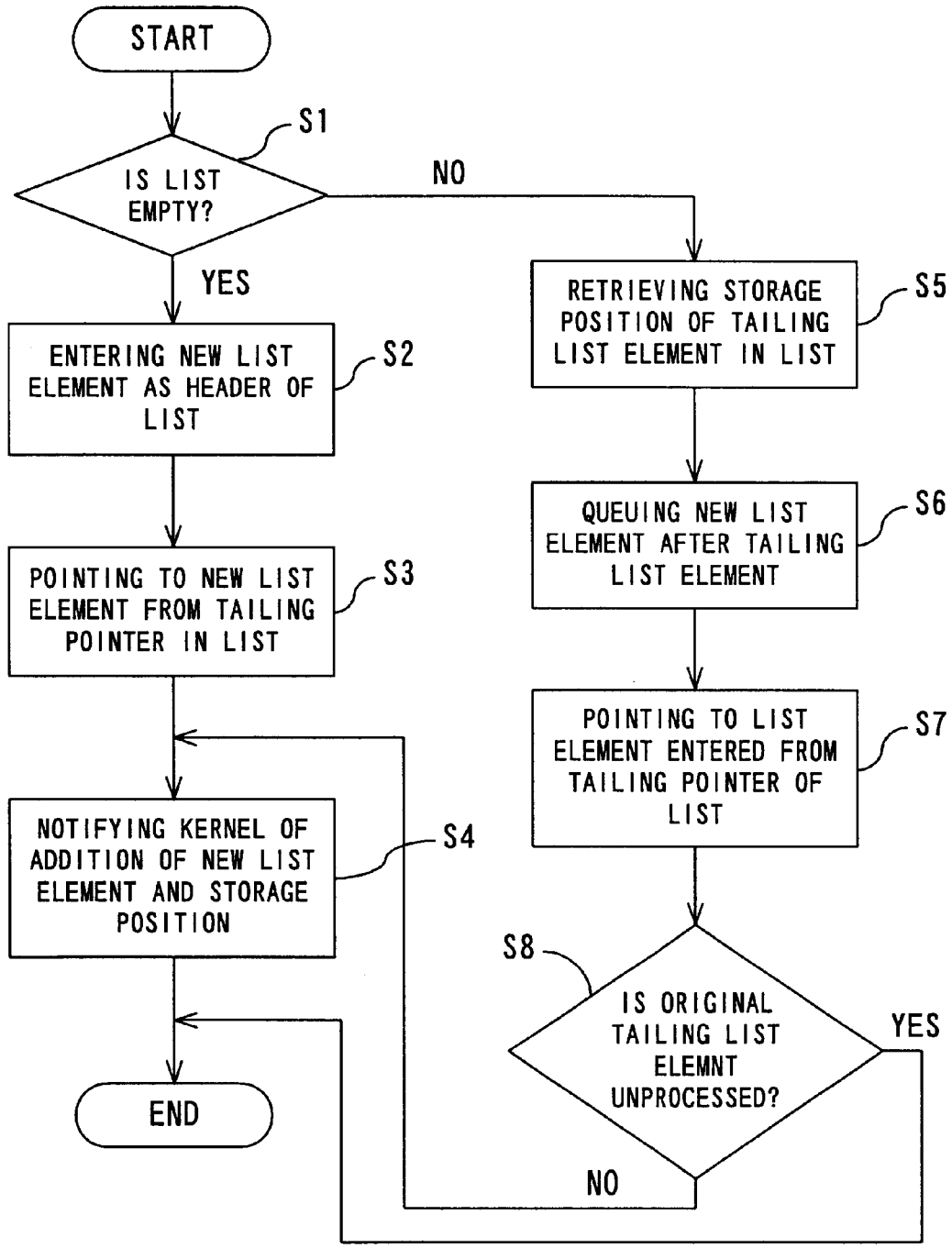
FIG. 4 is a flowchart of the process in case of adding a new list element to a request list in a user process.
Figure 5A:
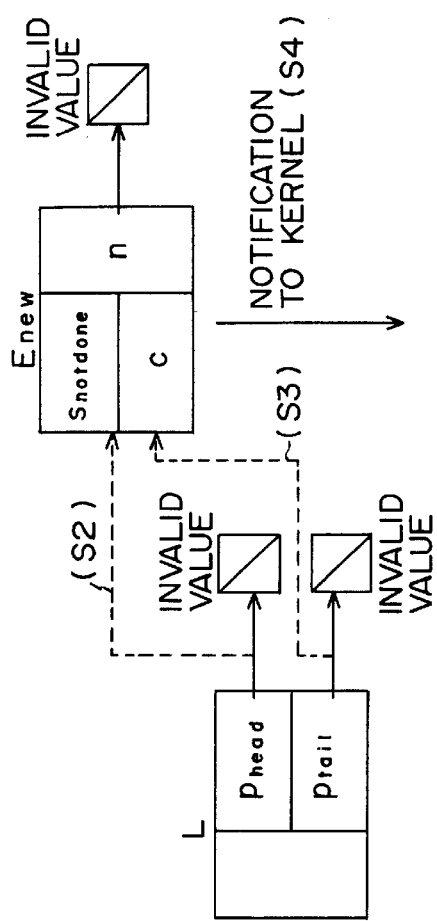
FIG. 5 shows the adding process shown in FIG. 4.

FIG. 4 is a flowchart of the process of the user process 40 adding a new list element to the request list 60. FIG. 5 shows the process shown in FIG. 4.

The request list adding unit 41 of the user process 40 performs the process shown in FIG. 4 when a new list element $E_{new}$ is added to the request list 60 to transmit a newly issued input/output request.

In step S1, the request list adding unit 41 determines whether a list element E is connected to the request list 60, that is, whether the request list 60 is empty, by checking whether an invalid value is set in the tailing pointer $P_{tail}$ of the list management unit L. When the request list 60 is empty (YES in step S1), control is passed to step S2. When it is not empty (NO in step S1), control is passed to step S5.

In step S2, the request list adding unit 41 sets the storage position of the new list element $E_{new}$ in the heading pointer $P_{head}$ of the list management unit L, and enters the new list element $E_{new}$ at the head of the request list 60. In addition, in step S3, the storage position of the new list element $E_{new}$ is set at the tailing pointer $P_{tail}$ of the list management unit L, the tailing pointer $P_{tail}$ points to the new list element $E_{new}$.

Then, in step S4, the kernel 50 is notified that the new list element $E_{new}$ has been added. When the notification is transmitted to the kernel 50, the kernel 50 is also notified of the storage position of the new list element $E_{new}$. Thus, the process of adding the new list element $E_{new}$ terminates.

Figure 5B:
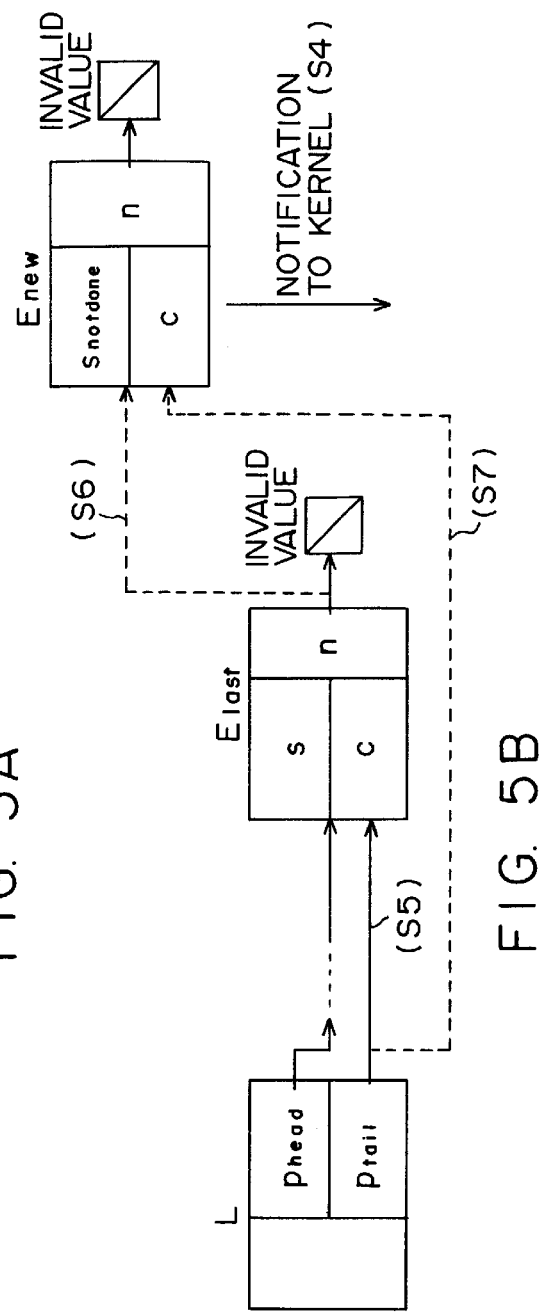

If a request list 3 is not empty when a new list element $E_{new}$ is added (No in step S1), the storage position of the tailing list element $E_{last}$ of the request list 60 is retrieved from the tailing pointer $P_{tail}$ of the list management unit L (step S5). Then, in step S6, as shown in FIG. 5B, the next element pointer n of the tailing list element $E_{last}$ of the request list 60 is set to point to the new list element $E_{new}$, and the new list element $E_{new}$ is queued in the request list 60. Then, in step S7, the storage position of the new list element $E_{new}$ is set in the tailing pointer $P_{tail}$ of the list management unit L. Thus, the tailing pointer points to $P_{tail}$ the new list element $E_{new}$.

After the process in step S7, that is, in step S8, the state information s of the original tailing list element $E_{last}$ is checked to determine whether the state of the process performed by the kernel 50 indicates 'unprocessed ($s_{notdown}$)'. If it indicates 'processed ($s_{down}$)' or 'being processed ($s_{busy}$)' (NO in step S8), then control is passed to step S4, and the kernel 50 is notified that the new list element $E_{new}$ has been added, and notified of the storage position, thereby terminating the process. In addition, if the state information s about the element $E_{last}$ indicates 'unprocessed ($s_{notdown}$)' (YES in step S8), then the kernel 50 is not notified that the new list element $E_{new}$ has been added, thereby terminating the adding process.

As described above, regardless of whether a process is being performed on the previously issued input/output request, the kernel 50 is notified of a new input/output request when it is issued, and synchronous is established between a user space and a kernel space according to the conventional technology. On the other hand, according to an embodiment of the present invention, the process of notifying the kernel 50 of the addition of a new list element $E_{new}$ can be omitted if a list element whose state is 'unprocessed ($s_{notdown}$)' is contained in the request list 60. Since the cost of the CPU time for the notification from the user process 40 to the kernel 50 is generally high, the above described process is effective in realizing an efficient input/output process performed on the entire process by reducing the times of notification from the user process 40 to the kernel 50.

FIG. 6 is a flowchart of the process performed by the request list deleting unit 42 in the user process 40 when the user process 40 deletes a list element whose process has been completed from the request list 60. FIG. 7 shows the process shown in FIG. 6.

The request list deleting unit 42 of the user process 40 performs the process shown in FIG. 6 periodically or when a notification of the completion of the process is issued, or by any optional trigger in order to delete from the request list 60 a list element corresponding to an input/output request whose process to be performed by the kernel 50 has been completed.

In step S10, the request list deleting unit 42 determines whether the request list 60 is empty by checking whether an invalid value is set in the heading pointer $P_{head}$ or the tailing pointer $P_{tail}$ of the list management unit L. When the request list 60 is empty (YES in step S10), it is not necessary to delete the list element E, thereby terminating the deleting process.

When the request list 60 is not empty (NO in step S10), control is passed to step S11, and the request list deleting unit 42 obtains the storage position of the heading list element E-1 from the heading pointer $P_{head}$ of the list management unit L. In the next step S12, the request list deleting unit 42 checks the state information s indicating the state of the heading list element E-1.

As described later, since the process in the driver on the kernel 50 side can enter the subsequent input/output process without waiting for the completion of the preceding process according to the present embodiment, the input/output processes are not always completed in the starting order. Therefore, although the heading list element has not indicated 'processed $(s_{down})$', the subsequent list elements can indicate 'processed $(s_{down})$'. Accordingly, if the state information s is not 'processed $(s_{down})$' in step S12, the process by the kernel 50 has not been completed on the heading list element E-1. Therefore, the next element pointer n is checked (NO in step S16), control is passed to the next list element (step S17), and control is then returned to step S12. If an invalid value is set in the next element pointer n in step S16, and the list element is the tailing element in the request list 60 (YES in step S16), then the process terminates.

If the state information s of the list element E indicates 'processed $(s_{down})$' in step S12 (YES in step S12), control is passed to step S13, and the value stored in the next element pointer n of the heading list element E-1 is set in the heading pointer $P_{head}$ of the list management unit L (when the heading element is not to be deleted, the value stored in the next element pointer n of the list element $E_n$ to be deleted is set in the next element pointer n of the list element $E_{n-1}$ which is one element before the list element $E_n$), thereby removing the list element E from the request list 60 and deleting it.

FIG. 7A shows the process in step S13. The value of the heading pointer $P_{head}$ is changed into the pointer value (the next element pointer n in the list element E-1 (an invalid value in case of the tailing element)) indicating the position of the list element E-2 stored in the list element E-1, thereby deleting the list element E-1 from the request list 60.

Then, in step S14, it is checked whether there are no list elements E remaining in the request list 60, and the request list 60 is empty. If it is not empty (NO in step S14), then control is passed to step S17, the process is transferred to the next list element according to the next element pointer n, and the above described process is repeated. If the request list 60 is empty (YES in step S14), then control is passed to step S15, and the value of the heading pointer $P_{head}$ is set as the tailing pointer $P_{tail}$ in the request list 60 as shown in FIG. 6B, thereby indicating that the request list 60 is empty, and terminating the deleting process.

Figure 8:
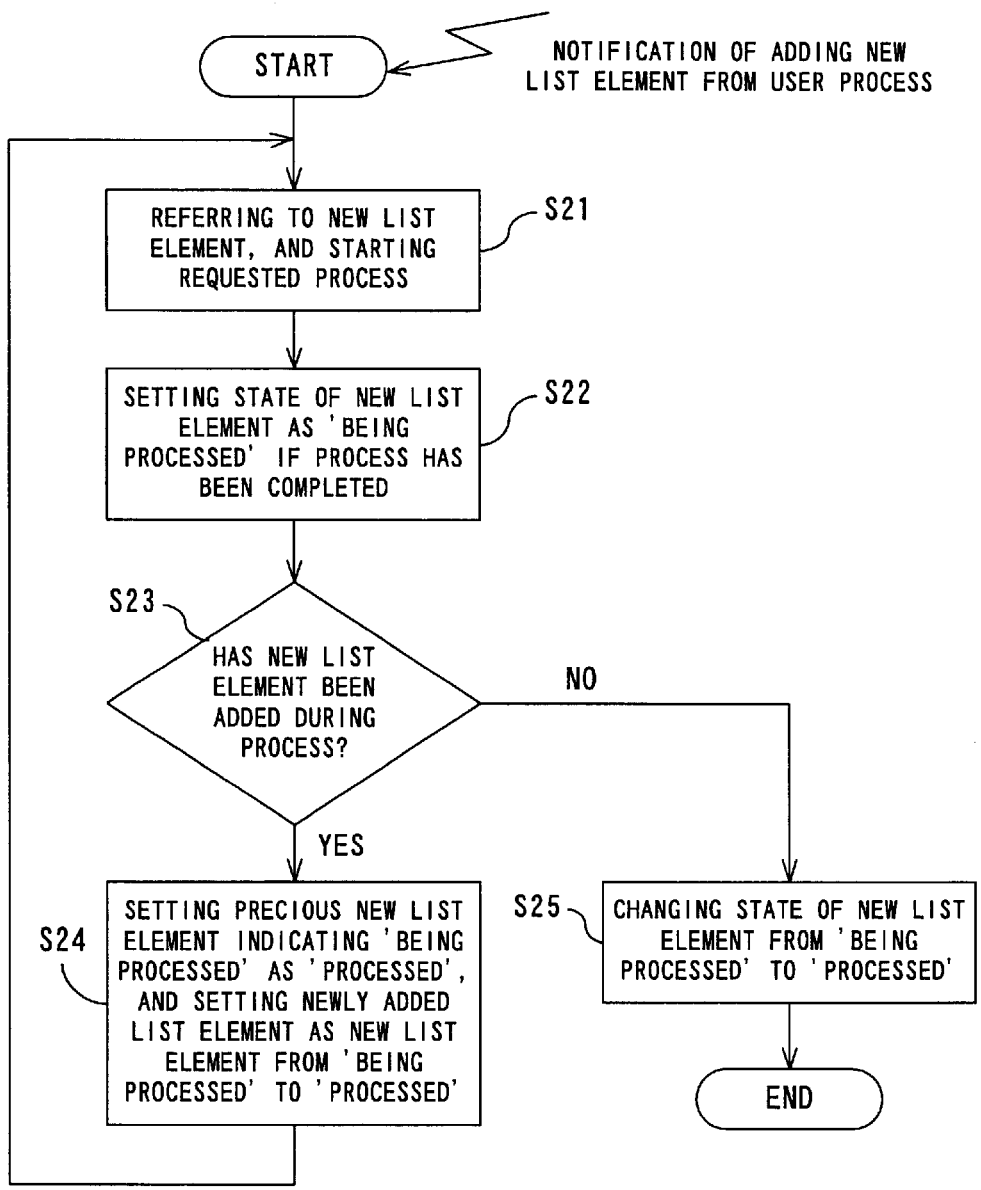
FIG. 8 is a flowchart of processing a request list in a kernel.

FIG. 8 is a flowchart of the process performed by the kernel 50 on the request list 60.

Upon receipt of a notification from the user process 40, the request list process unit 51 of the kernel 50 processes an input/output request issued by the user process 40 using the request list 60 as follows.

When a notification about the addition of a new list element $E_{new1}$ and its storage position is issued by the user process 40, the obtained new list element $E_{new1}$ is referred to, the contents c of the request are checked, and the process requested by the user process 40 is started in step S21. In step S22, when the process of the contents C of the request of the new list element $E_{new1}$ is completed, the state information s of the new list element $E_{new1}$ is set to 'being processed $(s_{busy})$'.

Next, in step S23, it is checked whether or not the user process 40 has added a new list element $E_{new2}$ while the kernel 50 is processing the request of the new list element $E_{new1}$, by checking the next element pointer n in the new list element $E_{new1}$ which has been processed. If the new list element $E_{new2}$ has been added (YES in step S23), control is passed to step S24. If it has not been added, then control is passed to step S25.

In step S24, the storage position of the newly added list element $E_{new2}$ obtained from the next element pointer n in step S23 is stored (held), and the value of the state information s indicating the state of the previous list element $E_{new1}$ whose current state is 'being processed $(s_{busy})$' is set to 'processed $(s_{down})$'. Furthermore, the newly added list element $E_{new2}$ is regarded as a new list element $E_{new}$ to be processed, and the processes from step S21 are repeated.

When no list elements are added by the user process 40 in step S23 (NO in step S23), then the value of the state information s indicating the state of the list element $E_{new1}$ is changed from 'being processed $(s_{busy})$' to 'processed $(s_{down})$' (step S25), thereby terminating the process.

In step S22, the value of the information s indicating the state is set to 'being processed $(s_{busy})$' to prevent the possibility that a notification to the kernel 50 can be missing during the process of the kernel 50 while the user process 40 is performing the new request adding process (S4 after NO in step S8) shown in FIG. 4.

In the process in step S24, The kernel 50 temporarily stores the storage position of the newly added list element $E_{new2}$, and then changes the state information s for the following reason.

If, in the process in step S24, the value of the state information s indicating the state is first changed into 'processed $(s_{down})$', and the next list element is referred to, then the new list element $E_{new}$ can be deleted by the user process 40 in the process performed by the request list deleting unit 42 shown in FIG. 6 when the value of the state information s is changed into 'processed $(s_{down})$'. As the result, the value of the next element pointer n of the list element is also changed. If the value of the next element pointer n has been changed, a new list element next added by the kernel 50 cannot be referred to depending on the timing of the change, thereby causing the possibility of inconsistency in the process logic.

Therefore, according to the present embodiment, the value of the state information s of the new list element $E_{new1}$ processed by the kernel 50 is temporarily set as 'being processed ($s_{busy}$)', the storage position of the new list element $E_{new2}$ which is the value of the next element pointer n of the list element $E_{new1}$ is stored, and the value of the state information s indicating the state of the new list element $E_{new1}$ is changed from 'being processed ($s_{busy}$)' to 'processed ($s_{down}$)', thereby deleting the list element $E_{new1}$. In this process, the inconsistency in the process which can be caused by a change of the value of the next element pointer n can be prevented.

Figure 9:
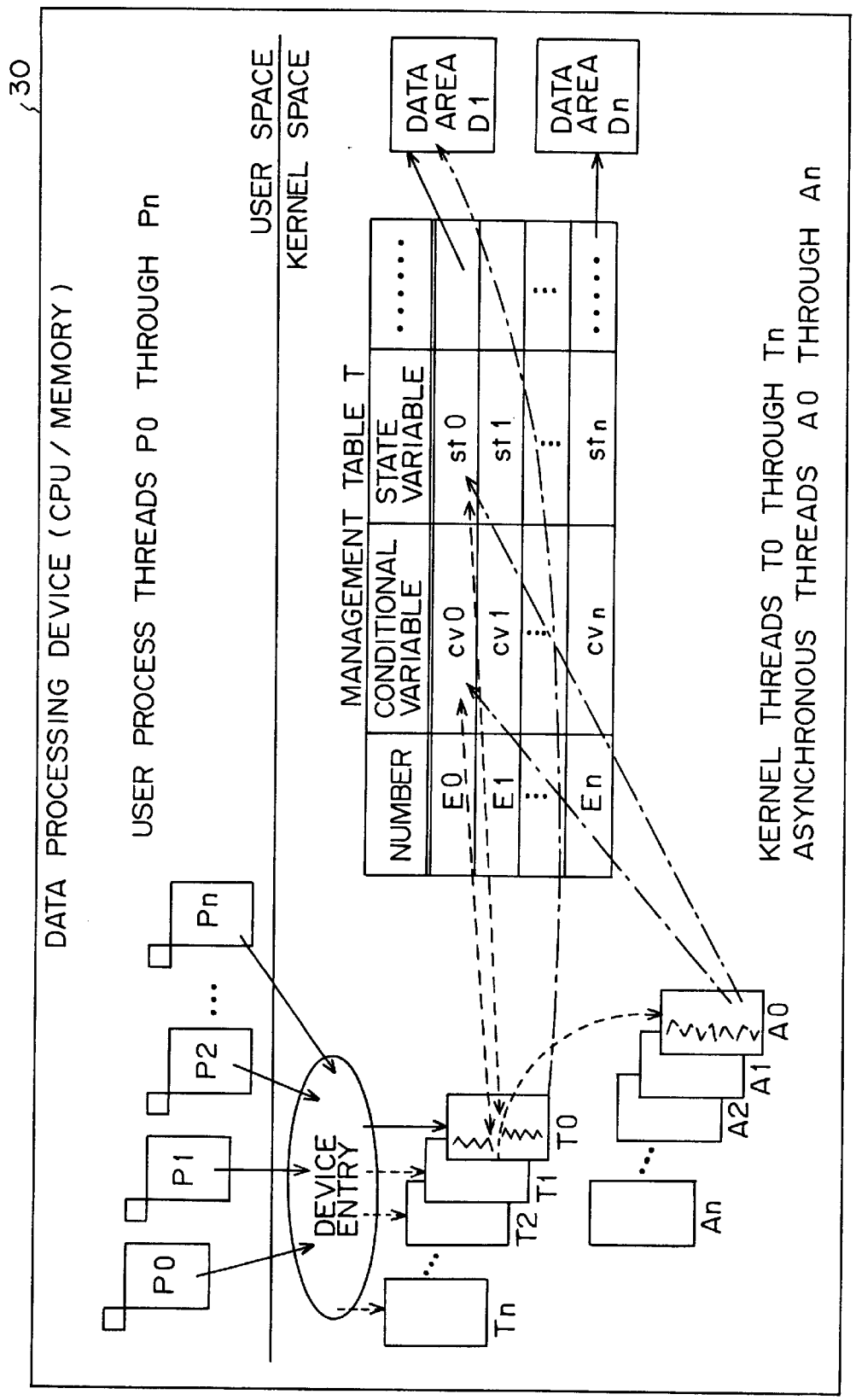
FIG. 9 shows a process in a device driver in response to an input/output request from a user process.

FIG. 9 shows the process performed by the data processing device 30 in a device driver in response to an input/output request from a user process according to the present embodiment.

In FIG. 9, user process threads P0, P1, and P2 operates in a user space. A device entry D accepts an input/output request. Kernel threads T0, T1, . . . , Tn operate in a kernel space, and process an input/output process request. Asynchronous threads A0, A1, . . . , An are the second threads for operating in a kernel space, and processing an input/output process request. A management table T manages a conditional variable and a state variable corresponding to each of the kernel threads T0, T1, . . . , Tn. Data areas D1, . . . , Dn are used in inputting and outputting data.

The management table T is managed with the entry numbers, conditional variables, state variables, and the pointers pointing to the positions of data areas corresponding to the kernel threads T0 through Tn and the asynchronous threads A0 through An for processing an input/output request from the process p associated with one another. The management table T is represented in a table format for easier explanation, but actually is a group of a plurality of variables. In the variables, the state variable can be defined, for example, as a flag '0' indicating 'incomplete process', and a flag '1' indicating 'process completed', or can be defined as a state bit. The state variable is not limited to binary information indicating an incomplete process or a completed process, but can be defined as a variable indicating a plurality of states as described later.

Entry numbers E0, . . . , En in the management table T respectively correspond to kernel threads T0, . . . , Tn, and are added each time a memory entry function is invoked. Conditional variables cv0, . . . , cvn are assigned to a kernel system known as, for example, a UNIX operating system, etc. A driver program cannot substitute a value for the condition variable. State variables st0, . . . , stn in the management table T are a group of variables indicating the process states pertaining to each conditional variable cvx. The state variable stx is a variable introduced in the present system, and is used by a driver program setting a value for transition of a state.

According to the present embodiment, a portion for which a prediction cannot be made as to when a process can be completed in the processes to be performed in response to an input/output request from a user process thread Px is extracted as a separate thread. This thread can be divided into a kernel thread Tx and an asynchronous thread Ax.

When the user process thread P0 issues a data input/output process request through the device entry D, the kernel thread T0 is invoked. After reserving the data area D1, the kernel thread T0 calls a data input/output function to activate the asynchronous thread A0. At this time, the conditional variable cv1 of the kernel system corresponding to the entry number E1, which is the entry number of the kernel thread T0, is prepared, and the corresponding state variable st1 is assigned an appropriate value.

After finishing a series of processes, the activated asynchronous thread A0 writes an appropriate value to the state variable st1 by utilizing the conditional variable cv1. The kernel thread T0 monitors the state variable st1, and suspends the process until the condition is satisfied such that other threads, for example, the kernel threads T1, T2, etc. can use the CPU. When the asynchronous thread A0 rewrites the state variable st1, and the condition is satisfied to resume the process by the kernel thread T0, the kernel thread T0 continues performing the subsequent processes, and stores an appropriate value in the data area D1 after completing the process.

Thus, in the conventional system the process of the kernel thread T0 and the process of the asynchronous thread A0 are performed in the same thread. Therefore, the process of another thread cannot be started, before the process of a thread is completed or enters a sleeping (waiting) state. On the other hand, according to the present embodiment, a thread for processing an input/output process request in a kernel space is divided into the kernel thread T0 (first thread) and the asynchronous thread A0 (second thread) as shown in FIG. 9. Therefore, when the kernel thread T0 activates the asynchronous thread A0, and requests the asynchronous thread A0 to perform a process, control can pass the CPU time to other threads, for example, the kernel threads T1, T2, etc.

Figure 10:
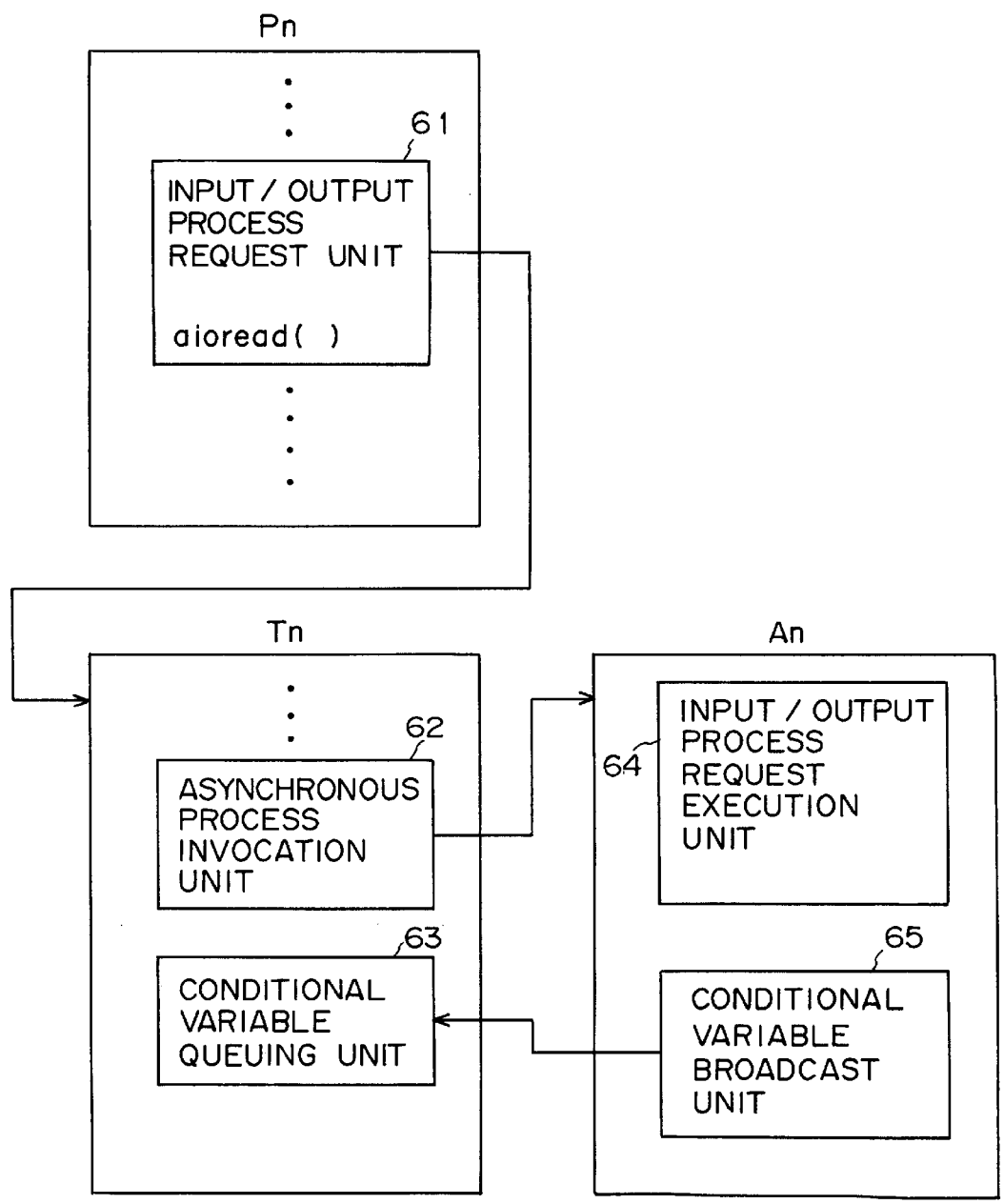
FIG. 10 shows a queuing process performed using a conditional variable.

FIG. 10 shows the queuing process using a conditional variable.

According to the present embodiment, a thread is divided using a conditional variable. As shown in FIG. 10, in the user process thread Pn, when input/output process request unit invokes a function aioread(3) to request the device driver of the kernel to perform an asynchronous read process, the kernel thread Tn is activated in response to the read request.

In the kernel thread Tn, an asynchronous process invoke unit 62 invokes the asynchronous thread An which is the second thread, and a conditional variable queuing unit 63 waits for the completion of the requested process. During the queuing process, the kernel thread Tn releases the CPU in the sleeping state so that other threads can acquire the CPU time.

In the asynchronous thread An, an input/output process request execution unit 64 processes the requested input/output request. When the process is completed, a conditional variable broadcast unit 65 updates the state variable stn pertaining to the conditional variable cvn, and performs a broadcasting process to release the queuing process by the conditional variable of the kernel thread Tx.

The usage of the common conditional variable is well-known in a UNIX, operating system, etc. The method of using a conditional variable in the kernel thread Tx which requests a queuing process and the asynchronous thread Ax for performing the broadcasting process to release the queuing process is described below by referring to a practical example.

FIG. 11 shows an example of the method of using the conditional variable. FIG. 11 actually shows an example of describing the contents of a process in the C language which is a well-known programming language. It is obvious that the process according to the present embodiment can also be realized in other computer languages.

First, in the kernel thread Tx which requests a queuing process, the conditional variable queuing unit 42 located in the position where the queuing process is to be performed in the thread performs the process as shown in FIG. 11A.

In FIG. 11, kmutex_enter (&mutex) is a function of starting exclusive control using a exclusive variable mutex (variable prepared by a kernel). State corresponds to the state variable stx shown in FIG. 9, and condvar corresponds to the conditional variable cvx. The state indicates the state bit (state variable) of a system. As long as the bit state indicates a value equal to the value of OUTSTANDING indicating the state of making an entry, executing the function cv_wait ( . . . ) is described. The function cv_wait ( . . . ) refers to performing a process of maintaining the current state until the condition changes by the conditional variable condvar. When the condition changes and the queuing process is released, the exclusive control by the exclusive variable mutex is terminated by the kmutex_enter (&mutex), thereby terminating the queuing process.

In the asynchronous thread Ax for performing a broadcasting process to the kernel thread Tx to release the queuing process, the conditional variable broadcast unit 65 shown in FIG. 10 and located where the thread is to terminate the process performs the process as shown in FIG. 11B.

First, the exclusive control by the exclusive variable mutex is started by kmutex_enter (&mutex). Then, the bit state of the state which is the state bit of a system is set in the state other than OUTSTANDING indicating 'in process of entry' (the bit of state at the bit position set by the OUTSTANDING state is reset). Then, using the conditional variable condvar, the cv_broadcast (&condvar) is executed. The cv_broadcast (&condvar) is a function for broadcasting in the kernel driver that the condition has changed. Then, the exclusive control by the exclusive variable mutex is terminated by the kmutex_enter (&mutex).

It is desired that a thread for performing the resource collecting process (not shown in the attached drawings, but the resource collecting process is described later) contains the process sequence shown in FIG. 11C so that the collecting process cannot continue before the system entry process is completed when the system enters an abnormal state during the memory entry. The process shown in FIG. 11C is the same as the process of the conditional variable queuing unit 63 shown in FIG. 11A, and can be incorporated into the thread for performing the resource collecting process, thereby solving the problem in the abnormal state, standardizing the processes, and realizing high-speed processes.

The flow of the asynchronous data input/output process is described below in detail by referring to an example in which a UNIX system function is used.

(1) A device driver can be invoked from a user process thread P in a user space using an asynchronous input/output function aioread(3). The function aioread(3) is activated by a user-side invocation to perform an asynchronous read process on a device driver. Using this function as an entry point, the device driver of a kernel transmits and receives a necessary argument for an input/output process through the device entry D using the function aread(9E) in the kernel thread Tn.

(2) A function of a memory management unit 26 is invoked from the function aread(9E) on the device driver side. This function in the kernel thread Tn links information to a necessary instance, and reserves the necessary data area Dn for a data fixing process. If the data area Dn has been successfully reserved, the kernel thread Tn invokes a function aphysio(9F) for asynchronous invocation to perform the data fixing process. The function aphysio(9F) is invoked on the device driver side, and is used to perform an asynchronous input/output operation between a corresponding device and an address space indicated by a corresponding element of an instance managing an input/output request.

(3) Since a process to be actually performed is described in a function strategy(9E) in a function aphysio(9F) corresponding to the asynchronous thread An, the function aphysio(9F) invokes a function bp_mapin(9F) for use in performing a data fixing process in the function strategy (9E). The function strategy(9E) is indirectly invoked by a kernel for reading and writing several blocks of data in a block device, and is invoked by the function aphysio(9F) in the present system. The function bp_mapin(9F) is used to assign a virtual address space by a device driver.

(4) The function strategy(9E) performs a data fixing process using the function bp_mapin(9F). Upon completion of the process, the function strategy(9E) makes the function cv_broadcast(9F) broadcast for the kernel thread Tn which is waiting for the completion of the process using the conditional variable condvar.

(5) A function of the memory management unit 26 of the kernel thread Tn is used to detect the completion of the process of the asynchronous thread An by the above described broadcast, notifies the user of the completion of the process by sweeping the handle in the user process thread Pn through the device entry D.

Described above is an example of the process for the input/output request according to an embodiment of the present invention. The difference between the present invention and the conventional system is that a process is shared among a plurality of threads using the conditional variable condvar according to the system of the present embodiment while the conditional variable condvar is not used in the (4) and (5) above according to the conventional system.

In the conventional system, a series of processes using the memory management unit function→the function aphysio (9F)→the function strategy(9E)→the function bp_mapin (9F)→the memory management function are processed as a thread. Therefore, while a thread is performing a series of processes, another thread cannot acquire the CPU time.

On the other hand, according to the system of an embodiment of the present invention, the process such as a queuing process on a kernel, etc. whose completion cannot be predicted is separated as another thread by the conditional variable condvar introduced to the function strategy(9E) located at the intermediate portion of a series of processes, thereby dividing a process into a plurality of divisions. Therefore, the CPU time can be assigned to another thread. Especially, in an asynchronous process, there is the possibility that a queuing process arises in a corresponding asynchronous function, thereby wasting the CPU time. The system according to the present invention can minimize the waste.

In an asynchronous data input/output process according to the system of the present embodiment, the following secondary effect can be obtained.

For example, it is assume that an abnormal system fault has occurred in any of the above described processes (1) through (5). In this case, a resource collecting process has to be performed. According to the present embodiment, the value indicating the state of fixing a data area is stored in the state variable state fetched together with the conditional variable condvar. Thus, a fatal panic to the operating system which can be caused by collecting resources while processing a fixed data area can be successfully avoided. In the broadcast using the conditional variable condvar, the resource collecting process can be performed in a static state after the data area fixing process has been completed by notifying the resource collecting process thread of the completion of the process.

On the other hand, the conventional system cannot obtain a trigger for the resource collecting process when an abnormal system fault occurs. Therefore, in most cases in the conventional system, exclusive control (mutex) is performed with a function of the resource collecting process, etc., in a memory management function. In this case, the CPU time is wasted more than in the system according to the present invention.

FIG. 12 shows the process in a device driver 70 performed when an adapter is assigned to an input/output request by the data processing device 30 according to the present embodiment.

The data processing device 30 according to the present embodiment processes a plurality of adapters of the same type as one device. When a plurality of adapters are detected, each adapter is set to be used with as state flag. If some of the plurality of adapters are faulty, but others are available, then the available adapters are used for the process.

Processing a plurality of adapters of the same type as one device removes the necessity of generating a flow control process for designing a high-reliability system or a high-performance system on the user side.

In FIG. 12, a process P such as an application, etc. operates in a user space, D is a device entry, the device driver 70 processes an input/output request from the process P, an OPEN process unit 71 performs a process associated with a start request (open) to use a decide (adapters A0 through An), a CLOSE process unit 72 performs a process associated with an termination request (close) to stop the device, a input/output request process unit 73 actually inputs and outputs data for the device, an adapter selection unit 731 selects an adapter for inputting and outputting data from among the adapters A0 through An, a process identifier check unit 732 checks a process identifier, and determines whether the device can be accessed or not, 74 is a management table for management of necessary information, required for the input/output control of a device, such as an adapter management table 741, a resource management table 742, a process management table 743, etc., and the adapters A0 through An are network adapters, etc.

The adapters A0 through An shown in FIG. 12 correspond to the network interface controller 22 shown in FIG. 1. For example, they are I/O cards of the same type for network communications.

The device driver 70 processes the plurality of adapters A0 through An of the same type as one device, and a common device entry D accepts an input/output request from the process P in a user space to the device. That is, one device driver 70 is provided for a plurality of adapters A0 through An of the same type, and the user process P in the user space functions independent of the number of adapters.

The device driver 70 is invoked when a start request (open) to use the device is issued from the process P, obtains a minor device number from the OPEN process unit 71 using a minor number generation function at an invocation entry point when the device is invoked, and assigns it to each user process P which newly invokes the device driver 70.

Thus, in a device driver requiring resource management for each process, a resource collecting process can be performed for each process.

When an input/output request is issued from a user process P to a device corresponding to the device driver 70, the adapter selection unit 731 of the device driver 70 refers to the adapter management table 741, selects one of the adapters A0 through An for each input/output request, and performs an input/output process. Thus, a load can be shared, and when an adapter becomes faulty, another adapter can replace the faulty adapter in performing an inputting and outputting process, thereby improving the reliability of the system.

In addition, according to the present embodiment, the CLOSE process unit 72 performs a resource collecting process relating to a device based on the minor device number assigned at the opening time when a termination request (close) to stop the device is issued from the user process P.

Each resource performs a predetermined termination process according to the resource collection process. A resource element has each reference counter, and collects resources when the reference counter reaches 0. However, when an asynchronous input/output request is issued, an exclusive error thread is prepared to monitor and issue a notification of a trigger for the thread monitoring and collecting resources.

Using the resource management table 742, the device driver 70 manages the multiple level for the use of resources by the user process P for each resource relating to the device. The device driver 70 checks whether or not the multiple level (reference counter) for the use of each resource has reached 0 in a predetermined order entered in the resource management table 742 as a collecting process for each resource relating to a device in an abnormal process when the device is stopped (close), and cleans up (collecting process) the resource when the multiple level for the use reaches 0.

Therefore, by terminating the use of a device as a cleanup process for each resource when an abnormal process occurs during the data input/output process in a computer system, the correct cleanup process can be performed when a resource in an asynchronous data input/output process system is contained in a system, or when resources are correlated in a system.

The device driver 70 has a structure for managing a process. At each entry point of the device driver 70, a source process identifier and a process identifier already entered in the process management structure in the driver are checked. If they do not match each other, the access is rejected by determining that a child process has tried the access. Thus, an exclusive process can be performed on the access to a resource.

Thus, the following problem can be solved. That is, when a process generates a child process, and shares the resources in a driver, there occurs a problem when a notification of the completion (close) of the use of a device is issued to a drive of one process, that is, there occurs the problem that although there is a process still using an adapter, the relating resource in the driver can be released.

In the device driver 70, the process identifier PID of the user process P having the resource of the device is managed using the process management table 743. The process identifier check unit 732 compares the identifier of the source user process P with the identifier of the user process P having the resource at each entry point of the device driver 70. When they do not match, the access request is rejected.

FIG. 13 shows the process of assigning an adapter performed by the device driver 70 in response to an input/output request by the user process P.

Conventionally, a, device driver is normally generated for each of the adapters A0, A1, . . . , An for inputting and outputting data. Therefore, when a high-reliability system is designed with a load distributed by a plurality of input/ output adapters of the same type, it is necessary to realize flow control in the user process P.

On the other hand, according to the present embodiment, the device driver 70 accepts an input/output request through the common device entry D from the user process P in the user space as shown in FIG. 13. As a process performed in the device driver 70, the adapter selection unit 731 refers to the adapter management table 741 and assigns an input/output request to one of the plurality of adapters A0 through An.

On the adapter management table, the adapter management table 741 has, for each of the adapters A0, A1, . . . , a reference counter Ref for distributing a load in the environment of multiple adapters and a flag indicating whether an adapter is valid or not. The reference counter Ref counts the number of processes referring to each adapter. When an adapter is assigned to a user process P, the value of the counter is incremented. When an input/output process is completed, it is decremented. The reference counter Ref can also be realized as a state flag and a state bit, not as a counter. The flag is set as 'valid' when an adapter is available. When the adapter is not provided (An+1 shown in FIG. 13), or unavailable because it is faulty, the flag is set as 'invalid'. The adapter selection unit 731 selects an adapter in order from an adapter having the smallest value of the reference counter Ref.

FIG. 14 is a flowchart of the operations mainly in the adapter selecting process.

In step S31, an input/output request is accepted from the user process P in the user space through the device entry D. In step S32, the adapter selection unit 731 refers to the adapter management table 741, and selects an adapter having the smallest value of the reference counter Ref from among the valid adapters. When there are a plurality of adapters having the smallest values of the reference counter Ref, adapters are sequentially assigned from the top of the adapter management table 741.

Then, in step S33, the adapter selection unit 731 increments the value of the reference counter Ref of the selected adapter. In step S34, the adapter selection unit 731 performs an input/output process requested by the user process P for the selected adapter.

Then, the adapter selection unit 731 waits for the notification of the completion of the input/output process through an interruption, etc. (step S35). When the input/output process is completed, the adapter selection unit 731 subtracts 1 from the reference counter Ref of the adapter whose input/output process has been completed in step S36. In step S37, it notifies the user process P which has requested the input/output process of the input/output result, thereby terminating the input/output requesting process.

Described below in detail is an example of a process when the device driver 70 is attached to the system when the system is initialized. The following description is based on a UNIX type operating system.

(1) A flag f1 indicating whether or not the device driver 70 is attached to the first adapter A0 is prepared as a global variable, and the flag f1 is initialized as 1.
(2) A necessary parameter check that is, for example, used to determine whether the maximum open number is exceeded is performed.
(3) When the device driver 70 is attached to a system, a function_attach(9E) is invoked to attach a driver to a kernel.
(4) An error log is initialized.
(5) It is confirmed that a driver is attached to a kernel by checking whether the second argument is a command designation DDI_ATTACH.
(6) A local variable instance for serialization of an initializing process of an adapter (network interface controller) is incremented.
(7) It is confirmed whether the global variable F1 is 1. If it is 1, it refers to the first attachment of the adapter of the type. Therefore, the following sequence (8) through (12) is executed. If it is not 1, it refers to the second or subsequent attachment of a device driver to the adapter of the same type. Therefore, the subsequent portion of the sequence is omitted, thereby terminating the process.
(8) A high-level interruption is suppressed.
(9) The data of the function $_{13}$attach(9E) is initialized.
(10) /dev/admin and /dev/nic are generated by a function ddi_create_minor_node( ) for generating a minor node equivalent to a device entry.
(11) If the process up to (10) above has been completed, the global variable f1 is set to 0.
(12) An I/O register is mapped by assigning the management data of a real adapter, for example, the amount of resources such as available memory, etc., and physical information specific to the adapter such as the maximum value of an instance by referring to a prepared device setting file.

As described above, a flag f1 indicating whether it is the first attachment to the adapter of the type is provided as a global variable or not, and a device entry is made only for the first attaching process. Thus, one driver is attached to adapters (network interface controllers) of the same type.

FIG. 15 shows the process performed in the open/close state according to the present embodiment.

Figure 15A:
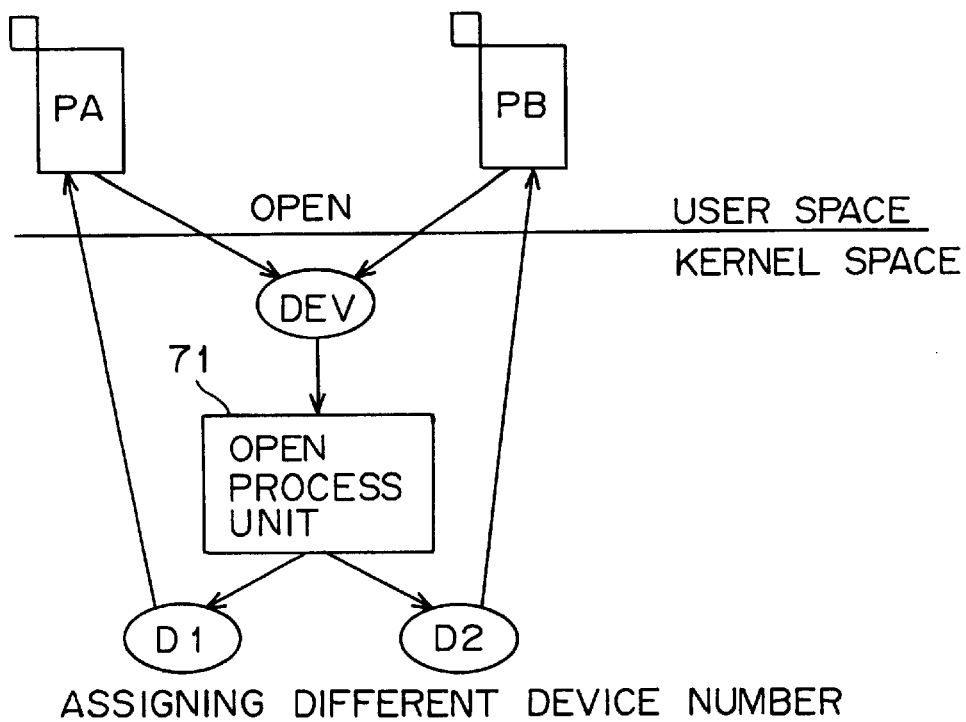
FIG. 15 shows the processes of an OPEN process unit and a CLOSE process unit.

In FIG. 15A, PA and PB are processes in the user space. When the user processes PA and PB issue 'open' to the same device Dev, the OPEN process unit 71 in the kernel space generates device management information having new minor device numbers D1 and D2 for each 'open' of the user processes PA and PB, and returns the newly generated device numbers D1 and D2.

The device numbers D1 and D2 assigned to the respective user processes PA and PB are stored in the process management table 743.

Figure 15B:
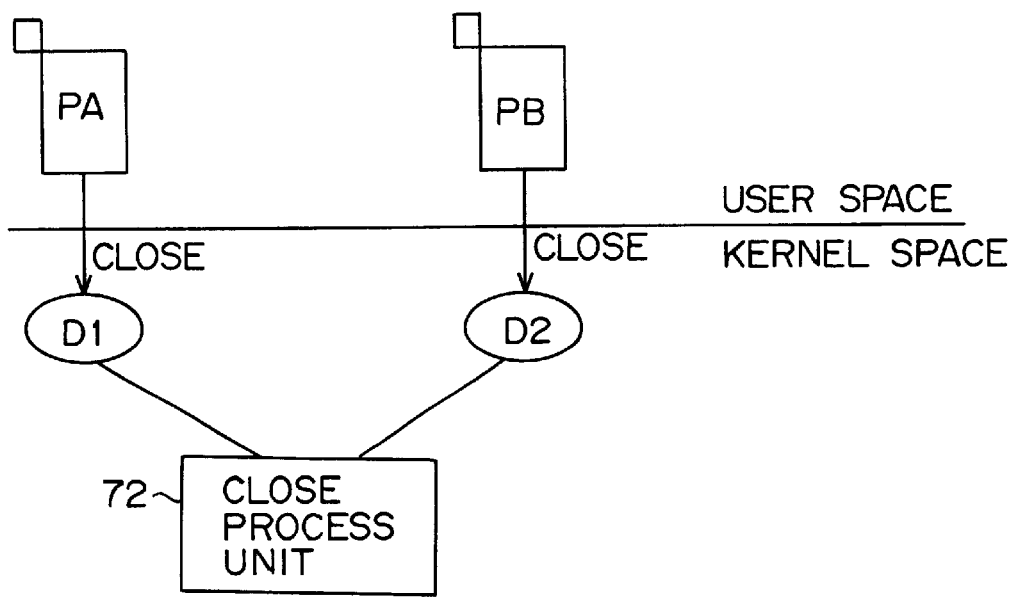

Thus, the device numbers D1 and D2 are respectively assigned to the 'open' by the user processes PA and PB, and the resource management is performed for each process. Therefore, as shown in FIG. 15B, when the user processes PA and PB close a device, a close request from each of the devices having the device numbers D1 and D2 reaches a kernel. Therefore, the CLOSE process unit 72 can perform the cleanup of the related resources when 'close' is issued from each process.

The example process of the above process is described further in detail below.

(1) When the device driver 70 is opened in the system, a series of _open( ) functions are invoked.
(2) The device driver 70 invokes a function getminor( ), and obtains the minor device number (and the major device number) of the device.
(3) It is determined whether the major device number obtained from the function getminor( ) indicates /dev/admin or /dev/nic, and it is confirmed that the /dev/nic on the application program 10 side has invoked. If the /dev/nic is confirmed, the following processes are performed.
(4) It is checked whether the /dev/admin is opened (that is, the system monitor unit 12 is active) or not. If it is not opened, the process terminates, and exits.
(5) A process structure is assigned to memory. The process structure is described later in detail.

(6) A process identifier is obtained by a system function drv_gerparm( ), and the value is stored in the process structure.
(7) An exclusive variable for processing the process structure is initialized.
(8) The number of 'open' is counted, and the process terminates when a predetermined value is exceeded.
(9) The minor number of a process array storing the process structure is determined.
(10) A new device number is generated by system function makedevice( ) and getmajor( ).

As described above, resources are managed for each process by assigning a device number to each process.

FIG. 16 shows the cleanup process according to the present embodiment.

In FIG. 16, P is a user process in a user space.

The user process P according to the present embodiment preliminarily generates two threads T1 and T2 for the cleanup process when it is activated. The T1 is an error thread for performing the normal cleanup process, and the T2 is an asynchronous data input/output monitor thread.

If the user process P abnormally terminates when the user process P processes an asynchronous request and transits to a kernel space, then the problem that the resources reserved at the asynchronous request cannot be cleared, and a memory leak occurs, thereby wasting the main storage memory capacity.

To avoid the problem, a thread T2 for performing the cleanup process at an asynchronous request is prepared in addition to the error thread T1 for performing the normal cleanup process according to the present embodiment.

If the user process P abnormally terminates for any reason, the preliminarily generated two threads T1 and T2 are notified of the termination.

From the respective entry points, these two threads T1 and T2 issue to the device Dev a request for the close process for cleanup. In the close process when the cleanup process is performed, the CLOSE process unit 72 refers to the resource management table 742, and requests to perform the resource cleanup process on the correlated resources in order from those not associated with other resources.

Thus, according to the present embodiment, the cleanup process is started when 'close' is issued to the device Dev.

Figure 17:
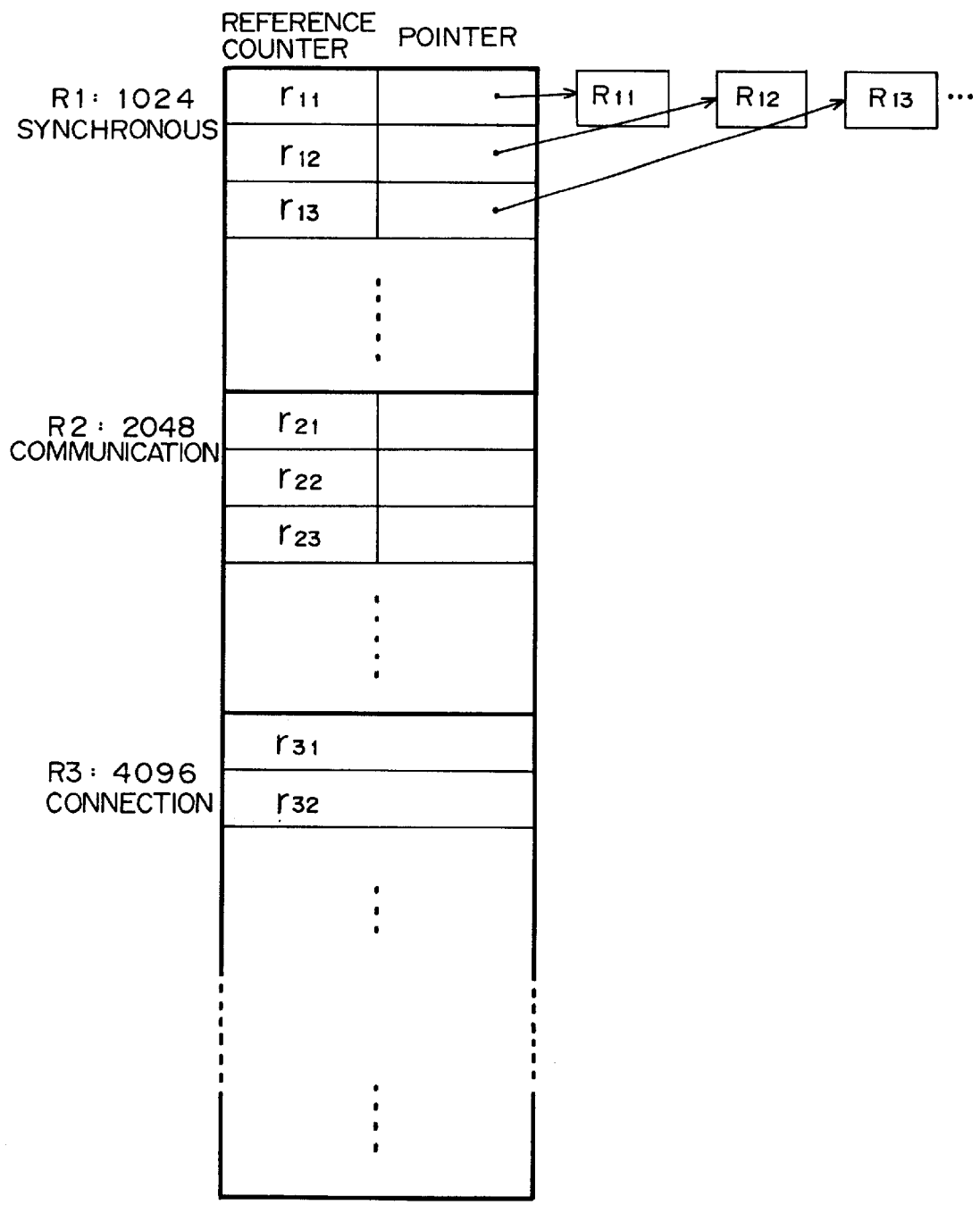
FIG. 17 shows an example of the configuration of a resource management table.

FIG. 17 shows an example of the configuration of the resource management table 742.

The resource management table 742 is used for management of the order of the resources collected in the cleanup process, and the multiple level for the use of the resources.

The resource management table 742 stores a resource R1 (synchronous in FIG. 17), a resource R2 (communication in FIG. 17), . . . in order from the lowest level of correlation with other resources.

A plurality of resource elements (1024 resource elements in the case of the R1 shown in FIG. 17) comprising reference counters and pointers are entered for the Rx portion on the resource management table 742, and the reference counter rxx counts the multiple level for the use of the resources. The pointer indicates the position of the current state of the resources.

In FIG. 16, the resource R1 is correlated with other resources at the lowest level, and the subsequent resources R2, R3, . . . are correlated with other resources at sequentially higher levels.

The cleanup process is performed for each resource. The elements are traced in order from the resource R1 having the lowest correlation level. Reference counters r11, r12, r13, . . . , r1n are confirmed. If the counter value decreases by the release of a memory entry, a disconnection entry of a connection, etc., and the reference counter reaches 0, then it is assumed that there are no more correlated resources, and the resources are collected. When the resource R1 has been completely collected, another collecting process is performed on the resource R2 having the second lowest level of correlation with other resources.

A notification from the asynchronous data input/output monitor thread T2 can be issued simultaneously with a notification from the normal error thread T1 with no problems occurring from the reference counter.

In this example, a resource refers to the structure of Instance managed by the instance management unit 14, the structure of Connection managed by the connection management unit 15, the structure of Memory and Protection managed by the memory management unit 16, the structure of Communication managed by the communications management unit 17, the structure of Device managed by the device control assignment unit 18, the structure of Synchronous managed by the synchronization control unit 19, etc. The R1 shown in FIG. 16 is, for example, the structure of Synchronous, the R2 is the structure of Communication, . . . , and the Rn is the structure of Memory.

To manage these structures, the arrangement of the maximum value of each resource is reserved according to the file for setting a device driver when the system is activated. They are referred to as handle structures. Each handle structure has a data structure determined when a driver is designed. The data structure is generated optionally at a user designation/request, and is connected to the handle structure in the double link system.

When a system is in an abnormal state, the cleanup process is performed at a request from the threads T1 and T2. The collection order of, for example, R1, R2, . . . , Rn is preliminarily determined for the resources to be processed such that the processes can be consistently performed when the system is cleared. The order is entered in the resource management table 742, and is determined, for example, as follows.

R1: Synchronous
R2: Communication
R3: Connection
R4: Instance
R5: Memory
R6: Protection
R7: Device Resources can be properly collected by performing the cleanup process in the above mentioned order, that is, handle structure R1→data structures r11, r12, r13, . . . →handle structure R2→data structures r21, r22, r23, . . . .

The above listed process procedure is described below furthermore in detail.

(1) When an application (user process P of a user) is activated, in the communications library the threads T1 and T2 for monitoring the application are activated by a system function th_create( ).
(2) When the application abnormally terminates, it is detected by the threads T1 and T2, and is notified to the device driver through an entry point of /dev/nic.
(3) The thread T1 performs the normal error process, and the thread T2 exclusively performs asynchronous input/output error processes.
(4) At a request from the thread T1, resources are processed in the cleanup process in a predetermined order.
(5) At a request from the thread T2 in parallel with (4) above, the asynchronous input/output resources are exclusively processed in the cleanup process.

(6) In the normal cleanup process, the completion of the process is awaited by the operation system when an asynchronous input/output is issued, but, according to the present embodiment, the process is not delayed by completing the concurrent requesting process of the thread T2.
(7) Finally, the process structure is processed in the cleanup process.

FIG. 18 shows the exclusive access to the resources according to the present embodiment.

In FIG. 18, PA and PB are a parent process and a child process in a user space. The PA has a process identifier (PID) p1, and the PB has a process identifier p2.

In FIG. 18, the PA and the PB try to access the same resource R. The owner of the resource R is the parent user process PA.

When the user process PA establishes communications, it reserves a data storage area for communications control, and communicates data through I/O control. At this time, since the child process PB has the memory image of the parent process PA as is, it tries to access the resources of the parent process PA.

According to the present embodiment, an exclusive process is performed in the kernel space using a process management table to suppress the access to the resource R from a process other than the process storing the resources.

The resource management table 742 holds the process ID of each process, and the resource R is assigned the entry p of the process ID which holds the resources in the resource management table 742.

Thus, at a request to access the resource R, the device entry D compares the process identifier P1 obtained from the resource management table 742 with the process identifier of the access requesting process, and permits the access when they match each other. Thus, the access restriction can be performed such that the access from the user process PA which holds the resource R can be permitted while the access from the user process PB is rejected.

FIG. 19 shows an example of a process structure.

In FIG. 19, the definition of the process structure is described in the well-known C language. A process structure holds management information required to manage the input/output process performed at a request from a process. The information includes a flag indicating the state whether or not a process is open or close, a reference count value, etc.

The exclusive process of accessing the resources shown in FIG. 18 is described below in detail.

(1) In the input/output function as an entry point to a device driver in a kernel space, an entered process identifier (PID) is obtained through a system function drv_getparm( ) used in obtaining a parameter.

(2) As in the process performed for the above described open/close process, a process identifier used when the device is opened is obtained from the process structure of the process which holds the resource.

(3) The process identifiers obtained in (1) and (2) above are compared with each other. If they do not match, the process is recognized as illegal access.

That is, each process is assigned a process structure as shown in FIG. 19, and the access restriction is performed by comparing the process identifier stored when the device is opened with the process identifier of the process requesting at another entry point.

Figure 20:
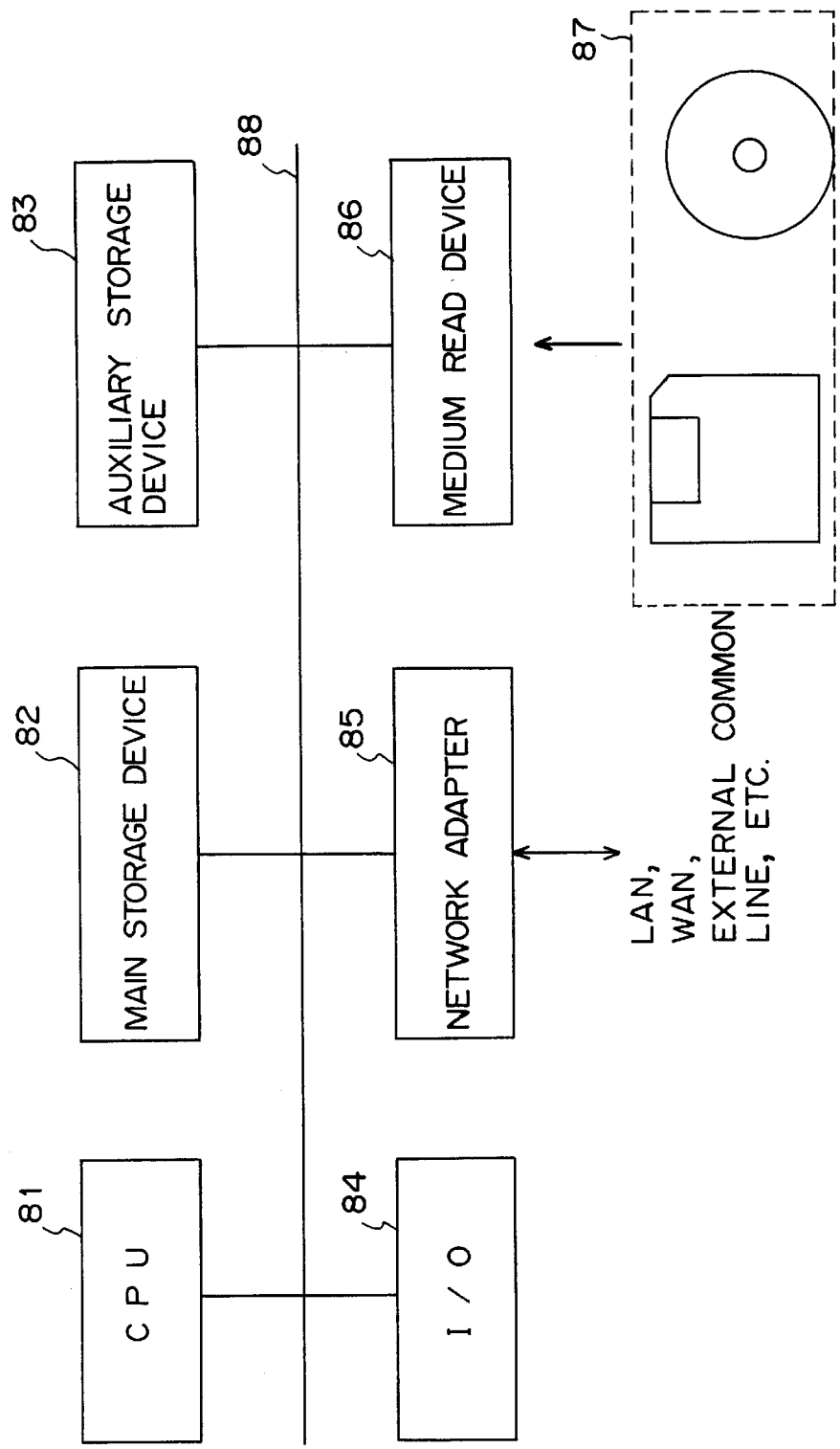
FIG. 20 is a view of a computer system environment showing the hardware configuration of a data processing apparatus.

FIG. 20 shows the computer system environment showing the hardware configuration of the data processing device 30.

As shown in FIG. 20, the data processing device 30 comprises a CPU 81, a main storage device 82 having ROM and RAM, an auxiliary storage device 83, an input/output device (I/O) 84 (for example, a display, a keyboard, etc.), a network adapter 85 for network connection to another node through a LAN, a WAN, a common line, etc., a medium read device 86 for reading stored contents from a portable storage medium 87 such as magnetic tape, etc., and has the configuration in which the above listed units are interconnected through a bus 88.

In the data processing device 30 shown in FIG. 20, the medium read device 86 reads the program and data stored in the storage medium 87 such as the magnetic tape, floppy disk, CD-ROM, MO, etc., and downloads them onto the main storage device 82 and/or the hard disk 83. Each process according to the present embodiment can be realized as functioning like software by the CPU 81 executing the program and data.

In addition, the data processing device 30 can exchange software using the storage medium 87 such as a floppy disk, etc. The present invention is not limited the above described data processing device or data input/output method, but can be realized as the computer-readable storage medium 87 for use in a computer for performing the functions of the above described embodiments of the present invention.

Figure 21:
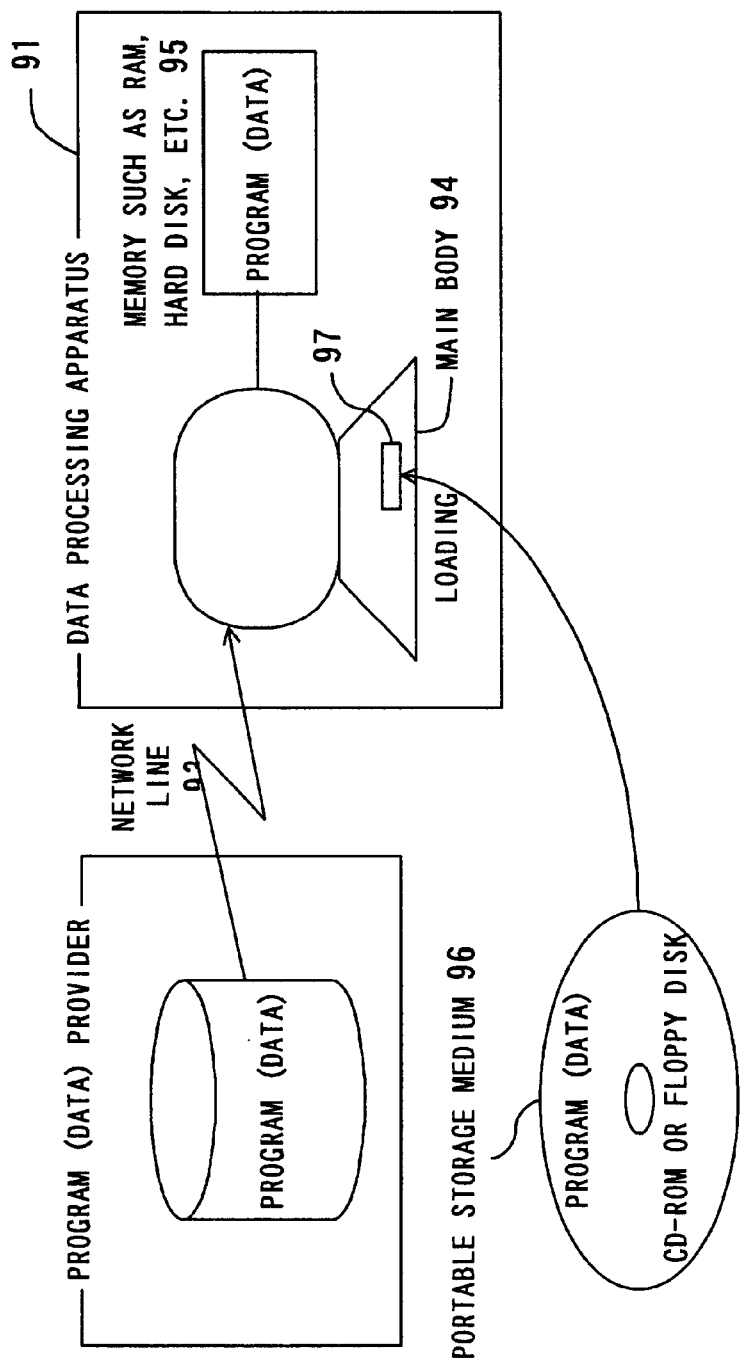
FIG. 21 shows an example of a storage medium.

In this case, the storage medium can be a portable storage medium 96, for example, CD-ROM, a floppy disk (or MO, DVD, removable hard disk, etc.) removable to and from a medium drive device 97 as shown in FIG. 21, a storage unit 92 (database, etc.) in an external device (server, etc.) for transmission through a network line 93, memory (RAM or a hard disk, etc.) 95 in a body 94 of a data processing device 90, etc. A program stored in the portable storage medium 96 and the storage unit (database, etc.) 92 is loaded onto the memory (RAM or a hard disk, etc.) 95 and executed.

According to the present invention, as described above, the synchronization control by a system call for the conventionally required exclusive control can be omitted in the data input/output process in a computer. Thus, the overhead pertaining the system call can be removed, and the process time required for a data input/output process can be considerably shortened.

In addition, in the asynchronous data input/output process for asynchronously inputting and outputting data, one thread does not continue holding the CPU, but can perform a process concurrently with another thread by introducing a conditional variable of a system and a stage variable (flag) of a system in a process for fixing a data area. Accordingly, the efficiency of the input/output process can be improved.

Furthermore, by processing a plurality of adapters of the same type as one device, the high reliability and high performance by distributing a load can be realized. In addition, the step for constructing a high-performance system and a process for flow control required to design a high-reliability system, which is a burden in the user process side, can be reduced.

By terminating the use of a device as a cleanup process for each resource when an abnormal process occurs during the data input/output process in a computer system, the correct cleanup process can be performed when a resource in an asynchronous data input/output process system is contained in a system, or when resources are correlated in a system.

Furthermore, in a device driver requiring resource management for each process, the minor number assigned to the devices of the same type is provided for each process, thereby giving the process termination timing, and performing the resource collecting process for each process.

The device driver contains a structure for process management, the process identifier is checked in accessing a resource, and a process is rejected when it tries access a resource, but does not hold the resource. Thus, the problem with the resource collecting process can be successfully solved.

What is claimed is:

1. A data processing apparatus having a function of asynchronously processing in a kernel space an input/output request from a process in a user space, comprising:

an input/output request holding unit existing in the user space, and holding the input/output request from the user space to the kernel space as a queue in a list structure; and a request list adding unit adding a new input/output request to the queue as a list element when the input/output request is issued in the process in the user space.

2. A data processing apparatus having a function of asynchronously processing in a kernel space an input/output request from a process in a user space, comprising:

an input/output request holding unit existing in the user space, and holding the input/output request from the user space to the kernel space as a queue in a list structure; and a request list adding unit adding a new input/output request to the queue as a list element when the input/output request is issued in the process in the user space, and wherein: said input/output request holding unit holds the input/output request and 'state' information indicating a process state of the input/output request as the list element; and said request list adding unit comprising a request list processing unit setting a value indicating 'unprocessed' as the state information of a list element when the list-element is added, further comprising:

a request list processing unit reading and processing the input/output request held in said input/output request holding unit, and a state information change unit changing the state information about the input/output request completely processed by said input/output request processing unit into a value indicating 'processed'.

3. The apparatus according to claim 2, further comprising:

a request list deleting unit deleting a list element of the input/output request indicated by the state information as 'processed' from the queue.

4. The apparatus according to claim 2, wherein said request list adding unit notifies said input/output request processing unit of the newly added input/output request when the list element is added and the state information in the list element at an end of the queue is the value indicating 'processed', and does not notify the input/output request processing unit when the state information is the value indicating 'unprocessed'.

5. The apparatus according to claim 2, wherein said state information change unit changes the state information about an input/output request completely processed by said input/output request processing unit into a value indicating 'being processed', changes the state information changed into the value indicating 'being processed' into a value indicating 'processed' after a new input/output request is made to be processed by said request list processing unit if the new input/output request has been added to the queue while said input/output processing unit is performing a process, and changes the state information changed into the value indicating 'being processed' into a value indicating 'processed' when the new input/output request has not been added to the queue while said input/output processing unit is performing a process.

6. A data processing apparatus having a function of asynchronously processing in a kernel space an input/output request from a process in a user space, comprising:

input/output request holding means existing in the user space and for holding the input/output request from the user space to the kernel space as a queue in a list structure; and request list adding means for adding a new input/output request to the queue as a list element when the input/output request is issued in the process in the user space.

7. A method of input/output data processing in a kernel space an input/output request from a process in a user space, comprising:

holding the input/output request in the user space, and holding the input/output request from the user space to the kernel space as a queue in a list structure; and adding a new input/output request to the queue as a list element when the input/output request is issued in the process in the user space.

8. A method of input/output data processing in a kernel space an input/output request from a process in a user space, comprising:

an input/output request holding unit existing in a user space, and holding the input/output request from the user space to the kernel space as a queue in a list structure; and adding a new input/output request to the queue as a list element when the input/output request is issued in the process in the user space, wherein:

said input/output request and state information indicating a process state of the input/output request are held as the list element, a value indicating 'unprocessed' is set as the state information of a list element when the list element is added to a new input/output request;

said input/output request held in said queue is read and processed; and said state information about the completely processed input/output request is changed into a value indicating 'processed'.

9. The method according to claim 8, comprising deleting the list element of the input/output request indicated by the state information as 'processed' from the queue.

10. The method according to claim 8, comprising notifying a process for processing said input/output request of the newly added input/output request when the list element is added and the state information in the list element at an end of the queue is the value indicating 'processed', and not notifying the process when the state information is the value indicating 'unprocessed'.

11. A storage medium, which is readable by an information processing apparatus, storing a program causing the information processing apparatus to perform a process, said process comprising:

holding an input/output request in the user space, and holding the input/output request from the user space to a kernel space as a queue in a list structure; and adding a new input/output request to the queue as a list element when the input/output request is issued in the process in the user space.

12. A method of input/output data processing an input/output request from a process in a user space, comprising:

holding the input/output request from a process in the user space in a list structure in a queue in the user space; and adding a new input/output request to the queue as a list element when the input/output request is issued in the process in the user space.

* * * * *